United States Patent
Farmer et al.

(10) Patent No.: US 9,733,361 B2
(45) Date of Patent: Aug. 15, 2017

(54) LOW POWER POSITIONING TECHNIQUES FOR MOBILE DEVICES

(71) Applicant: QUALCOMM Incorporated, San Diego, CA (US)

(72) Inventors: Dominic Gerard Farmer, Los Gatos, CA (US); William James Morrison, San Francisco, CA (US); Jie Wu, San Diego, CA (US); Krishnaranjan Rao, Sunnyvale, CA (US); Tong Lin, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 14/480,396

(22) Filed: Sep. 8, 2014

(65) Prior Publication Data

US 2015/0123847 A1 May 7, 2015

Related U.S. Application Data

(60) Provisional application No. 61/900,892, filed on Nov. 6, 2013.

(51) Int. Cl.
*G01S 19/34* (2010.01)
*G01S 19/06* (2010.01)
*G01S 19/24* (2010.01)

(52) U.S. Cl.
CPC .............. *G01S 19/34* (2013.01); *G01S 19/06* (2013.01); *G01S 19/24* (2013.01)

(58) Field of Classification Search
CPC ..................................................... G01S 19/34
USPC .............. 342/357.25, 357.4, 357.46, 357.74; 701/468, 490
See application file for complete search history.

(56) References Cited

U.S. PATENT DOCUMENTS

| 5,448,773 A | 9/1995 | McBurney et al. |
| 6,683,564 B1 | 1/2004 | McBurney |
| 7,450,062 B2 | 11/2008 | McBurney et al. |

(Continued)

FOREIGN PATENT DOCUMENTS

| AU | 2007216911 A1 | 4/2008 |
| CN | 1503003 A | 6/2004 |

(Continued)

OTHER PUBLICATIONS

Partial International Search Report—PCT/US2014/062809—ISA/EPO—Feb. 2, 2015, 6 pgs.

(Continued)

*Primary Examiner* — Dao Phan
(74) *Attorney, Agent, or Firm* — Hunter Clark PLLC

(57) ABSTRACT

Techniques for managing power consumption of a Global Navigation Satellite System (GNSS) receiver of a mobile device are provided. These techniques include a method that includes deriving a GNSS search window for the GNSS receiver based on a position uncertainty (PUNC) and a time uncertainty (TUNC), selecting a GNSS search mode based on the GNSS search window and resources available for searching for signals from GNSS satellite vehicles (SVs), wherein an estimated power consumption associated with execution of a GNSS search associated with the GNSS search mode does not exceed a power consumption limit specified for the GNSS receiver conducting the GNSS search using the GNSS search mode, and estimating a position of the mobile device.

30 Claims, 8 Drawing Sheets

Managing Power Consumption of GNSS Receiver for Position Determination

(56) References Cited

U.S. PATENT DOCUMENTS

| | | |
|---|---|---|
| 8,188,917 B2 | 5/2012 | Gronemeyer et al. |
| 2002/0169550 A1 | 11/2002 | Perlmutter et al. |
| 2011/0102257 A1 | 5/2011 | Spyropoulos et al. |
| 2011/0215966 A1 | 9/2011 | Kim et al. |
| 2012/0303171 A1 | 11/2012 | Barrett et al. |
| 2013/0099963 A1 | 4/2013 | Wu et al. |
| 2013/0227377 A1 | 8/2013 | Rao et al. |
| 2013/0278054 A1 | 10/2013 | Kritt et al. |

FOREIGN PATENT DOCUMENTS

| | | |
|---|---|---|
| EP | 2442127 A1 | 4/2012 |
| WO | 2005004502 A2 | 1/2005 |

OTHER PUBLICATIONS

International Preliminary Report on Patentability—PCT/US2014/062809, The European Patent Office—Munich, Germany, Jan. 7, 2016, 14 pgs.

International Search Report and Written Opinion—PCT/US2014/062809—ISA/EPO—May 8, 2015, 19 pgs.

Mobile Device

Managing Power Consumption of GNSS Receiver for Position Determination

Select GNSS search mode

Select GNSS search mode

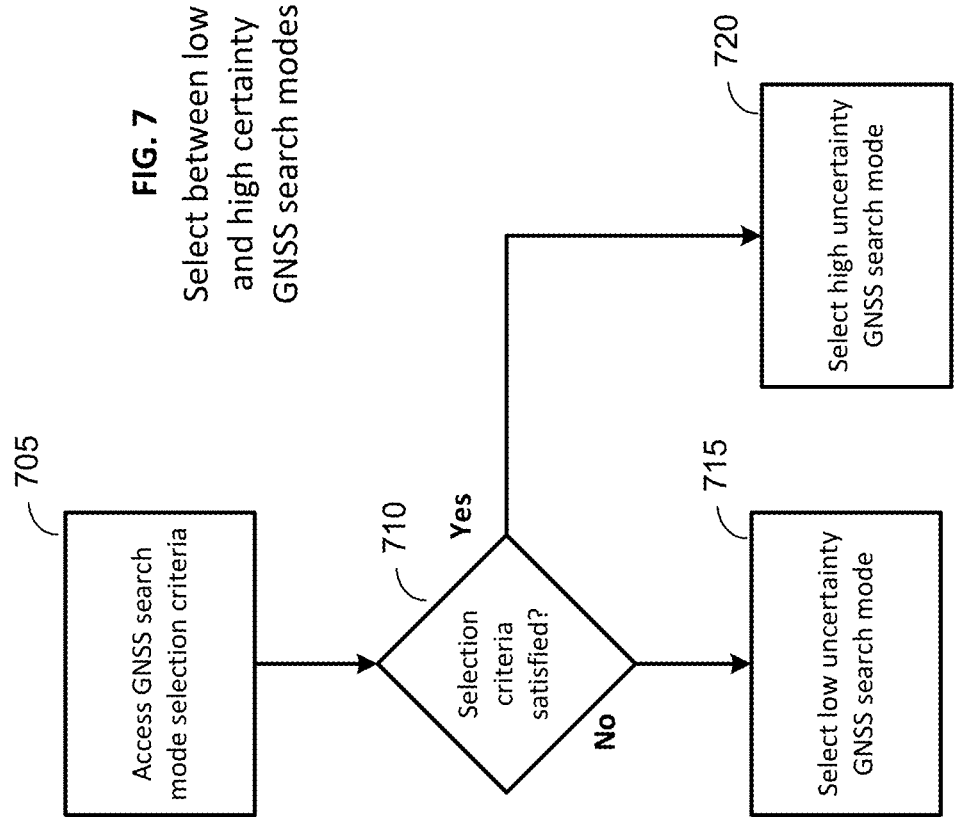

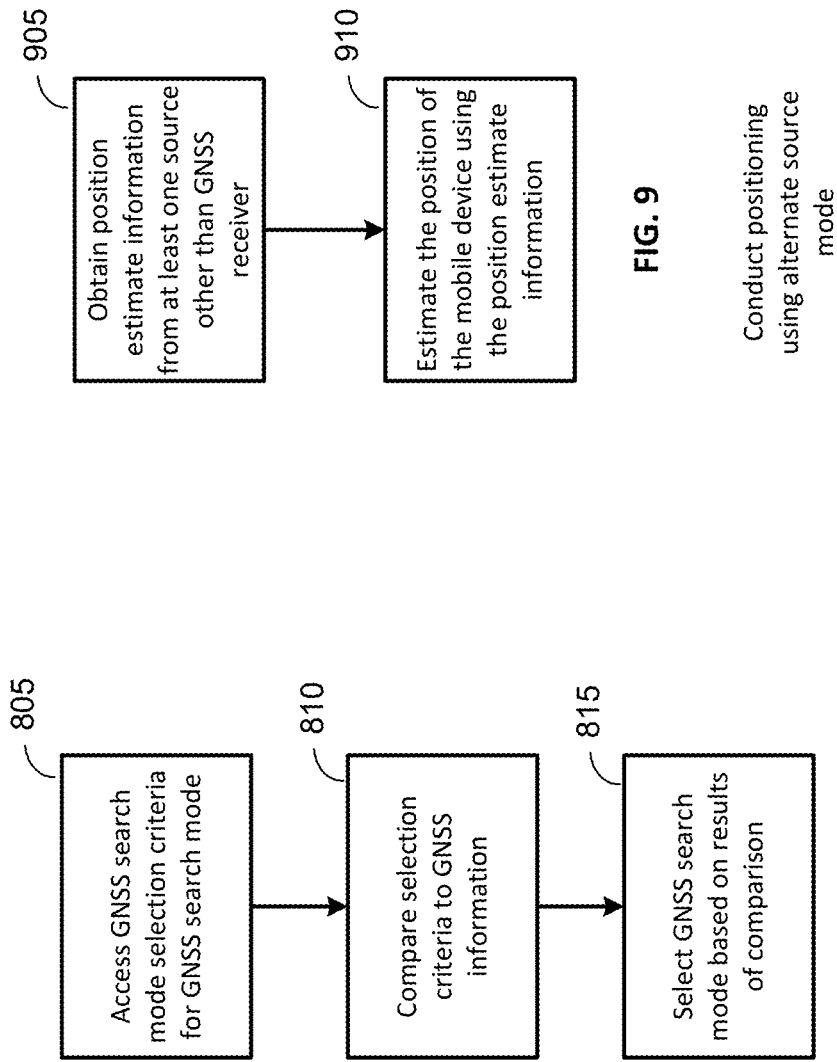

LOW POWER POSITIONING TECHNIQUES FOR MOBILE DEVICES

CROSS-REFERENCE TO RELATED APPLICATIONS

This application claims the benefit of U.S. Provisional Application No. 61/900,892, entitled, "LOW POWER POSITIONING TECHNIQUES FOR MOBILE DEVICES," filed on Nov. 6, 2013, the contents of which are incorporated by reference in their entirety.

BACKGROUND

Global Navigation Satellite System (GNSS) receivers have been incorporated into a multitude of devices, including mobile devices such as mobile phones, tablet computers, satellite navigation systems, and other portable devices. GNSS receivers have also been incorporated into wireless access points and terrestrial transceivers, such as femtocells to provide the wireless access point or terrestrial transceiver with precise location information.

Mobile devices, such as mobile phones, tablets, and other such devices that may make use of GNSS signals for positioning often face power constraints due to the limited size of the on-board batteries of such devices. GNSS positioning methods can have a significant impact on battery life of a mobile device. For example, in a conventional GNSS receiver, navigation is performed to achieve a required accuracy and the power consumption associated with the GNSS receiver is optimized to provide the required accuracy. However, this approach is suboptimal in situations where the power consumption associated with obtaining the position of the mobile device is more important than the accuracy of the position determination. A conventional approach to this problem is to reduce the accuracy requirements of the GNSS receiver to reduce the power consumption by the GNSS receiver. However, this approach may not be uniformly effective given the variable nature of GNSS signal conditions. The GNSS receiver may exceed the desired power consumption where the GNSS signal conditions are poor even if the accuracy requirements have been reduced. For example, in a densely built up urban environment the GNSS signals may be obstructed, at least in part, by buildings and other structures in the environment that can cause the accuracy to degrade. As a result, the GNSS receiver may consume more power attempting to acquire signals from a sufficient number of GNSS satellite vehicles (SVs) to be able to determine a position for the mobile device.

SUMMARY

An example method for managing power consumption of a Global Navigation Satellite System (GNSS) receiver of a mobile device according to the disclosure includes deriving a GNSS search window for the GNSS receiver based on a position uncertainty (PUNC) and a time uncertainty (TUNC); selecting a GNSS search mode based on the GNSS search window and resources available for searching for signals from GNSS satellite vehicles (SVs), wherein an estimated power consumption associated with execution of a GNSS search associated with the GNSS search mode does not exceed a power consumption limit specified for the GNSS receiver; conducting the GNSS search using the GNSS search mode; and estimating a position of the mobile device based at least in part on results of the GNSS search.

Implementations of such a method may include one or more of the following features. Determining the PUNC associated with the position of the mobile device, and wherein selecting the GNSS search mode based on the GNSS search window and the resources available for searching for signals from SVs includes selecting the GNSS search mode at least in part based on the PUNC. Wherein estimating the position of the mobile device includes estimating the position of the mobile device based at least in part on results of the GNSS search. Wherein the power consumption limit specified for the GNSS receiver includes an average power consumption limit over a predetermined period of time. Wherein selecting the GNSS search mode includes selecting the GNSS search mode from a low uncertainty mode and a high uncertainty mode, the low uncertainty mode being associated a smaller search window and a higher duty cycle, the high uncertainty mode being associated with a larger search window and a lower duty cycle. Wherein selecting the GNSS search mode from the low uncertainty mode and the high uncertainty mode based on the GNSS search window and the resources available for searching for signals from GNSS SVs comprises selecting the low uncertainty mode based at least one of sensor data information and GNSS signal strength information. Wherein selecting the GNSS search mode from the low uncertainty mode and the high uncertainty mode based on the GNSS search window and the resources available for searching for signals from GNSS SVs includes: selecting the low uncertainty mode as the GNSS search mode responsive to the estimated power consumption required to support the GNSS search window being less than or equal to the resources available for concurrently searching for signals from GNSS SVs; and selecting the high uncertainty mode as the GNSS search mode responsive to the estimated power consumption required to support the GNSS search window being greater than the resources available for concurrently searching for signals from GNSS SVs. Estimating the position of the mobile device without using results of the GNSS search responsive to the estimated power consumption required to support the GNSS search window at the GNSS receiver exceeding the resources available for concurrently searching for signals from GNSS SVs by a predetermined threshold. Estimating the position of the mobile device using results of the GNSS search further includes: obtaining additional position estimate information from at least one additional source of position related information other than the GNSS receiver, and estimating the position of the mobile device using the results of the GNSS search and the additional position estimate information. Wherein the additional position estimate information includes at least one of signal information from at least one terrestrial wireless transceivers proximate to the mobile device and signal information from at least one motion sensor associated with the mobile device. Wherein the power consumption limit specified for the GNSS receiver is received from an application running on the mobile device. Wherein the application running on the mobile device is configured to receive an input from a user of the mobile device and to set the power consumption limit based on the input from the user of the mobile device. Wherein the power consumption limit specified for the GNSS receiver is determined based on an accuracy requirement of at least one application running on the mobile device. Wherein the power consumption limit specified for the GNSS receiver is determined based at least in part on whether the mobile device is receiving power from an external power source or from a battery associated with the mobile device. Wherein the power consumption limit specified for the GNSS receiver can be specified as a hard limit or a soft limit, the method further comprising operating the GNSS receiver in a low power state in which the GNSS search is not conducted responsive to determining that the GNSS search would exceed the hard limit. Wherein the power consumption limit is associated with a power budget for the GNSS receiver, and selecting the GNSS search mode includes selecting a GNSS search mode associated with an estimated power consumption that exceeds the power consumption limit specified for the GNSS receiver but does not exceed the power budget for the GNSS receiver.

An apparatus for managing power consumption of a Global Navigation Satellite System (GNSS) receiver of a mobile device according to the disclosure includes means for deriving a GNSS search window for the GNSS receiver based on a position uncertainty (PUNC) and a time uncertainty (TUNC); means for selecting a GNSS search mode based on the GNSS search window and resources available for searching for signals from GNSS satellite vehicles (SVs), wherein an estimated power consumption associated with execution of a GNSS search associated with the GNSS search mode does not exceed a power consumption limit specified for the GNSS receiver; means for conducting the GNSS search using the GNSS search mode; and means for estimating a position of the mobile device using results of the GNSS search.

Implementations of such an apparatus may include one or more of the following features. The means for selecting the GNSS search mode comprises means for selecting the GNSS search mode from a low uncertainty mode and a high uncertainty mode, the low uncertainty mode being associated a smaller search window and a higher duty cycle, the high uncertainty mode being associated with a larger search window and a lower duty cycle. The means for selecting the GNSS search mode from the low uncertainty mode and the high uncertainty mode based on the GNSS search window and the resources available for searching for signals from GNSS SVs includes: means for selecting the low uncertainty mode as the GNSS search mode responsive to the estimated power consumption required to support the GNSS search window being less than or equal to the resources available for concurrently searching for signals from GNSS SVs; and means for selecting the high uncertainty mode as the GNSS search mode responsive to the estimated power consumption required to support the GNSS search window being greater than the resources available for concurrently searching for signals from GNSS SVs. Means for estimating the position of the mobile device without using the results of the GNSS search responsive to the estimated power consumption required to support the GNSS search window at the GNSS receiver exceeding the resources available for concurrently searching for signals from GNSS SVs by a predetermined threshold. The power consumption limit specified for the GNSS receiver is determined based on one or more of an input received from an application running on the mobile device, an accuracy requirement of the application running on the mobile device, a user input, and information indicating whether the mobile device is receiving power from an external power source.

A mobile device for compensating for managing power consumption of a Global Navigation Satellite System (GNSS) receiver of the mobile device according to the disclosure includes a tangible, non-transitory computer-readable memory; a plurality of modules comprising processor executable code stored in the tangible, non-transitory computer-readable memory; a processor connected to the memory and configured to access the plurality of modules stored in the memory; a low power positioning method module, and a position determination module. The low power positioning module is configured to derive a GNSS search window for the GNSS receiver based on a position uncertainty (PUNC) and a time uncertainty (TUNC), select a GNSS search mode based on the GNSS search window and resources available for searching for signals from GNSS satellite vehicles (SVs), wherein an estimated power consumption associated with execution of a GNSS search associated with the GNSS search mode does not exceed a power consumption limit specified for the GNSS receiver, and conduct the GNSS search using the GNSS search mode. The position determination module is configured to estimate a position of the mobile device based at least in part on results of the GNSS search.

Implementations of such a mobile device may include one or more of the following features. The low power positioning method module is configured to select the GNSS search mode from a low uncertainty mode and a high uncertainty mode, the low uncertainty mode being associated a smaller search window and a higher duty cycle, the high uncertainty mode being associated with a larger search window and a lower duty cycle. The low power positioning method module is configured to: select the low uncertainty mode as the GNSS search mode responsive to the estimated power consumption required to support the GNSS search window being less than or equal to the resources available for concurrently searching for signals from GNSS SVs, and select the high uncertainty mode as the GNSS search mode responsive to the estimated power consumption required to support the GNSS search window being greater than the resources available for concurrently searching for signals from GNSS SVs. The position determination module is configured to estimate the position of the mobile device without using results of the GNSS search responsive to the estimated power consumption required to support the GNSS search window at the GNSS receiver exceeding the resources available for concurrently searching for signals from GNSS SVs by a predetermined threshold. The low power positioning method module is configured to determine the power consumption limit specified for the GNSS based on one or more of an input received from an application running on the mobile device, an accuracy requirement of the application running on the mobile device, a user input, and information indicating whether the mobile device is receiving power from an external power source.

A non-transitory, computer-readable medium, having stored thereon computer-readable instructions for managing power consumption of a Global Navigation Satellite System (GNSS) receiver of a mobile device according to the disclosure includes instructions configured to cause a computer to derive a GNSS search window for the GNSS receiver based on a position uncertainty (PUNC) and a time uncertainty (TUNC), select a GNSS search mode based on the GNSS search window and resources available for searching for signals from GNSS satellite vehicles (SVs), wherein an estimated power consumption associated with execution of a GNSS search associated with the GNSS search mode does not exceed a power consumption limit specified for the GNSS receiver, conduct the GNSS search using the GNSS search mode, and estimate a position of the mobile device based at least in part on results of the GNSS search. The instructions configured to cause the computer to select the GNSS search mode include instructions configured to cause the computer to select the GNSS search mode from a low uncertainty mode and a high uncertainty mode, the low uncertainty mode being associated a smaller search window and a higher duty cycle, the high uncertainty mode being associated with a larger search window and a lower duty cycle. The instructions configured to cause the computer to select the GNSS search mode from the low uncertainty mode and the high uncertainty mode based on the GNSS search window and the resources available for searching for signals from GNSS SVs include instructions configured to cause the computer to: select the low uncertainty mode as the GNSS search mode responsive to the estimated power consumption required to support the GNSS search window being less than or equal to the resources available for concurrently searching for signals from GNSS SVs, and select the high uncertainty mode as the GNSS search mode responsive to the estimated power consumption required to support the GNSS search window being greater than the resources available for concurrently searching for signals from GNSS SVs. Instructions configured to cause the computer to estimate the position of the mobile device without using results of the GNSS search responsive to the estimated power consumption required to support the GNSS search window at the GNSS receiver exceeding the resources available for concurrently searching for signals from GNSS SVs by a predetermined threshold.

These features and other advantages of the system and method, as well as the structure and operation of various exemplary embodiments of the system and method, are described below.

BRIEF DESCRIPTION OF THE DRAWINGS

FIG. 7 is a flow is a flow diagram of a process for selecting a GNSS search mode from a low uncertainty search mode and a high uncertainty search mode.

FIG. 8 is a flow is a flow diagram of a process for selecting a GNSS search mode from multiple GNSS search modes.

FIG. 9 is a flow diagram of a process for conducting a position determination for a mobile device using an alternative source mode which uses position information from sources other than GNSS receivers.

DETAILED DESCRIPTION

Low Power Positioning Method (LPPM) techniques are disclosed herein in which a maximum GNSS power requirement can be specified and the positioning accuracy of the GNSS receiver is optimized to meet the specified power requirement. The techniques disclosed herein include the use of optimized GNSS search strategies. The LPPM techniques disclosed herein can also make use of additional information that can be used to derive the position of the mobile device that is not derived from signals received from the GNSS satellites. For example, the additional information that can be used to determine the position of the mobile device can include signals from microelectromechanical systems (MEMS) sensors included in the mobile device, externally sourced position information received by the mobile device, signal measurements of signals received from wireless terrestrial transceivers, and/or other information.

Example Network Environment

Figure 1:
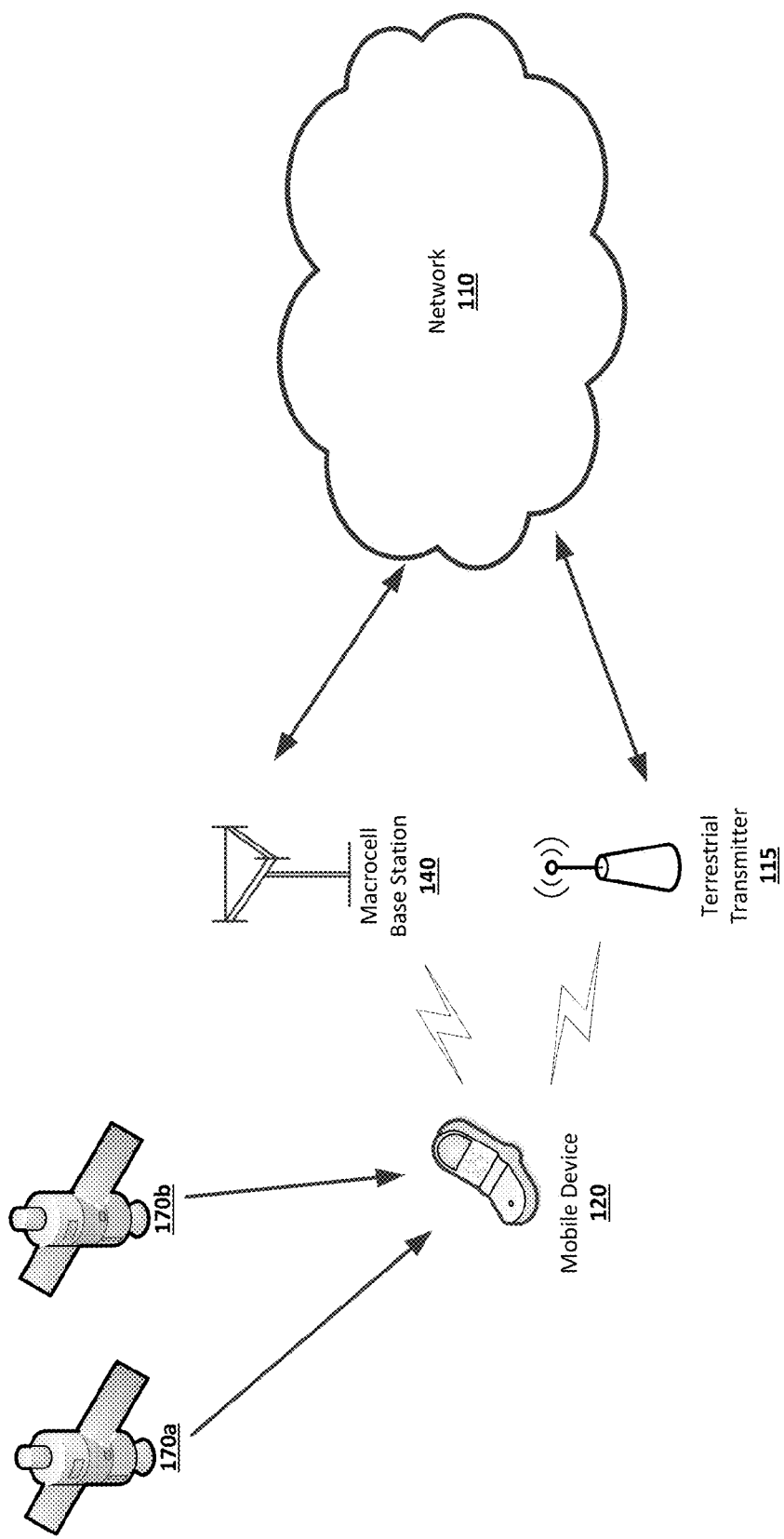
FIG. 1 is a block diagram of an example network architecture in which the techniques discussed herein can be implemented.

FIG. 1 is a block diagram of an example network architecture, which may be suitable for implementing the techniques discussed herein. The particular configuration illustrated herein is merely an example of one network configuration in which the techniques disclosed herein may be used. Furthermore, an implementation of such a network architecture may include additional elements that are not illustrated herein and have been omitted for the sake of clarity.

The mobile device 120 can be configured to include a GNSS receiver that is configured to receive and measure signals from one or more satellites 170 and obtain pseudo-range measurements for the satellites. Satellites 170 may be part of a Global Navigation Satellite System (GNSS), which may be the United States Global Positioning System (GPS), the European Galileo system, the Russian GLONASS system, or some other GNSS. The GNSS receiver may also be configured to detect and receive signals from satellites 170 belonging to more than one GNSS system. For example, satellite 170a may belong to the GPS system while the satellite 170b might belong to the Galileo system. While the example network architecture illustrated herein illustrates only two satellites 170, other implementations may have more or less satellites available, and the number of satellites visible to the mobile device 120 may depend upon the current geographical location of the mobile devices and the orbits of the satellites 170.

The mobile device 120 can also be configured to measure signals from one or more wireless base stations, such as the terrestrial transmitter 115 and the macrocell base station 140, and obtain timing measurements (e.g., for time of arrival (TOA) or observed time difference of arrival (OT-DOA)), signal strength measurements, and/or signal quality measurements for the wireless base stations. The pseudo-range measurements, timing measurements, signal strength measurements, and/or signal quality measurements may be used to derive a location estimate for the mobile device 120. A location estimate may also be referred to as a position estimate, a position fix, etc.

The mobile device 120 can also be configured to include a wireless wide area network (WWAN) transceiver that can be used to send and/or receive data from one or more wireless base stations, such as terrestrial transmitter 115 and the macrocell base station 140. The inclusion of a terrestrial transmitter 115 and a macrocell base station 140 merely illustrates one possible configuration of a network architecture. Other configurations may include more include additional base stations and/or may not include both terrestrial transceivers and macrocell base stations.

The terrestrial transmitter 115 may comprise a femtocell, a picocell, a microcell, or other type of terrestrial transmitter 115. In some implementations, the terrestrial transceiver can comprise a WLAN wireless access point or other type access point providing wireless network connectivity. The terrestrial transmitter 115 can be configured to provide wireless network connectivity to one or more mobile devices, such as the mobile device 120. The terrestrial transmitter 115 can be associated with a mobile communication network provider and can be configured to communicate with the mobile communication network provider's network (not shown) via the network 110. The coverage area of the terrestrial transmitter 115 may overlap with that of one or more macrocell base stations, such as macrocell base station 140, or that of one or more other terrestrial transceivers. The terrestrial transmitter 115 can be connected to network 110 via a backhaul connection that provides a broadband connection to the network 110. The network 110 may be the Internet and/or a combination of one or more networks. For example, the terrestrial transmitter 115 may be connected to a DSL modem or a cable modem, depending upon the type of broadband service being used in that particular implementation.

Macrocell base station 140 can be configured to provide wireless network connectivity to a plurality of mobile devices 120. The macrocell base station 140 may have a much larger coverage area than the terrestrial transmitter 115 or may be a terrestrial transceiver that provides a coverage area that is of a similar size or of a smaller size than the coverage are provided by the terrestrial transmitter 115. Macrocell base station 140 can be configured to communicate using one or more wireless communications protocols. While the example illustrated in FIG. 1 includes on a single macrocell base station 140, in other implementations, the terrestrial transmitter 115 may fall within the coverage area of multiple macrocell base stations 140, and the coverage area of the terrestrial transmitter 115 may overlap that of one or more other terrestrial transceivers.

The example network configuration illustrated in FIG. 1 is merely an example of one possible configuration of a network in which the techniques disclosed herein may be implemented. Other network configurations may include additional elements not illustrated in FIG. 1 and the various components may be interconnected in a different configuration than what is shown in FIG. 1.

Example Hardware

Figure 2:
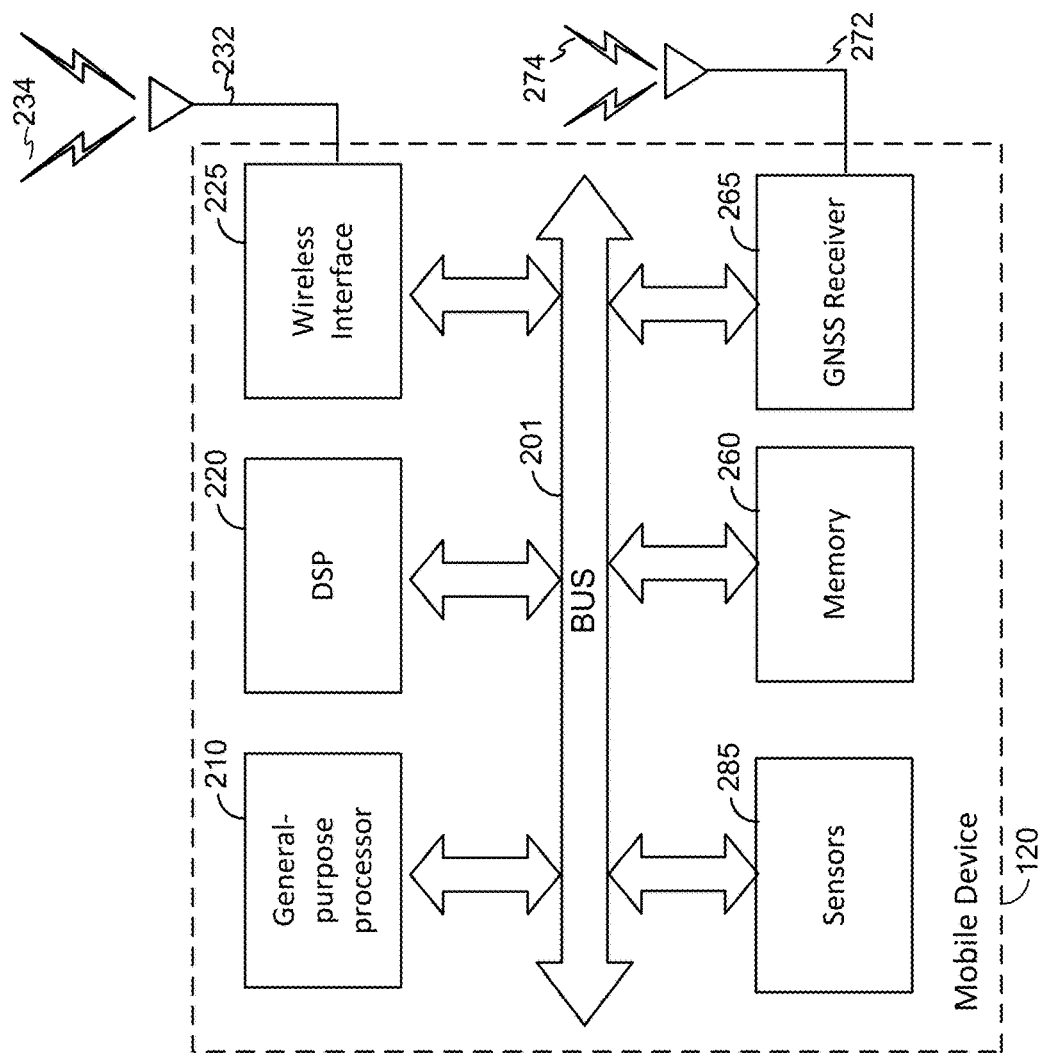
FIG. 2 is a block diagram of a mobile device that can be used to implement the mobile device illustrated in FIG. 1.

FIG. 2 is a block diagram of a mobile device that can be used to implement the mobile device 120 illustrated in FIG. 1. The mobile device 120 can be used to implement, at least in part, the process illustrated in FIG. 4.

The mobile device 120 comprises a computer system including a general-purpose processor 210, a digital signal processor (DSP) 220, a wireless interface 225, a GNSS receiver 265, and a non-transitory memory 260, sensors 285, connected to each other by a bus 201. The wireless interface 225 can include a wireless receiver, transmitter, transceiver, and/or other elements that enable the mobile device 120 to send and/or receive data using the wireless communications protocols associated with one or more wireless wide area network (WWAN) systems, wireless local area networks (WLANs), and/or other types of wireless communication protocols that can be used to send and/or receive data. The wireless interface 225 is connected by a line 232 to an antenna 234 for sending and receiving communications to/from the terrestrial transmitter 115, the macrocell base station 140, and/or other wireless devices configured to communicate using wireless communication protocols. Mobile device 120 may include one or more transceivers configured to receive and/or send communications using other wireless protocols in addition to or instead of the transceivers illustrated in FIG. 2.

The GNSS receiver 265 can include a wireless receiver and other elements that enable the mobile device 120 to receive signals from transmitters associated with one or more GNSS systems. The GNSS receiver 265 is connected by a line 272 to an antenna 274 for receiving signals from the GNSS transmitters. The GNSS receiver 265 can be configured to detect and receive signals from one or more GNSS, such as the United States Global Positioning System (GPS), the European Galileo system, the Russian GLONASS system, or some other GNSS system. The mobile device 120 can be configured to include a Low Power Positioning Module (LPPM) module that can interface with the GNSS receiver 265 that can control the operation of the GNSS receiver 265 in order control the power consumption by the GNSS receiver 265. The LPPM module is discussed in greater detail below with reference to FIG. 3.

DSP 220 can be configured to process signals received from the sensors 285, the wireless interface 225 and/or the GNSS receiver 265 and may be configured to process signals for or in conjunction with one or more modules implemented as processor-readable, processor-executable software code stored in memory 260 and/or may be configured process signals in conjunction with the processor 210.

The processor 210 can be an intelligent device, e.g., a personal computer central processing unit (CPU) such as those made by Intel® Corporation or AMD®, a microcontroller, an application specific integrated circuit (ASIC), etc. The memory 260 is a non-transitory storage device that can include random access memory (RAM), read-only memory (ROM), or a combination thereof. The memory 260 can store processor-readable, processor-executable software code containing instructions for controlling the processor 210 to perform functions described herein (although the description may read that the software performs the function(s)). The software can be loaded onto the memory 260 by being downloaded via a network connection, uploaded from a disk, etc. Further, the software may not be directly executable, e.g., requiring compiling before execution.

The software in the memory 260 is configured to enable the processor 210 to perform various actions, including implementing sending and/or receiving data from the terrestrial transmitter 115, the macrocell base station 140, other mobile devices 120, and/or other devices configured for wireless communication.

The sensors 285 can be configured to generate signals that the processor 210 and/or other components or modules of the mobile device 210 can used to determine the acceleration, rotation, and/or orientation of the mobile device 120. For example, the sensors 285 can include one or more microelectromechanical systems (MEMS) sensors, magnetic sensors, compasses, altimeters, and/or other types of sensors that can generate signals that can be used to determine a position of the mobile device 120. The signals output by the sensors 285 can be used to assist in determining a position of the mobile device 120 and may be used in conjunction with or instead of signal measurements obtained by the wireless interface 265 and/or the GNSS receiver 265.

Figure 3:
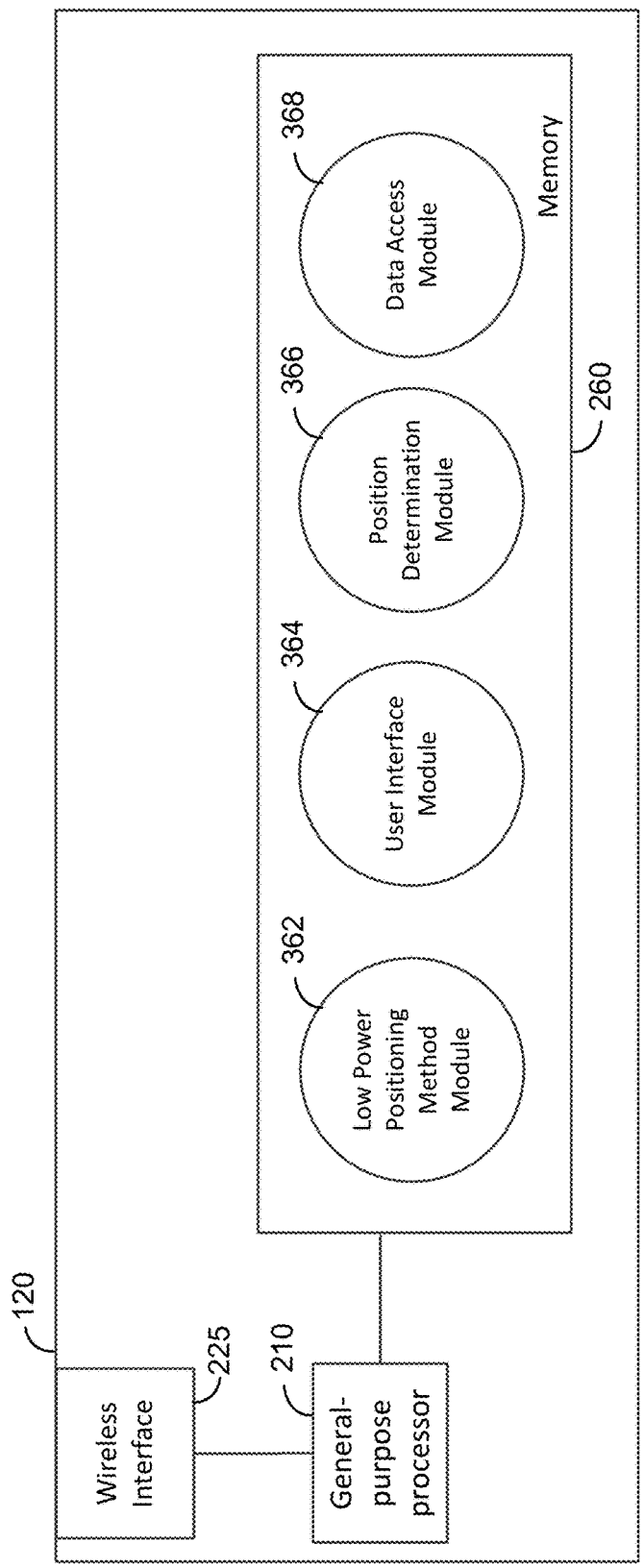
FIG. 3 is a functional block diagram of the mobile device illustrated in FIG. 2 that illustrates functional modules of the memory shown in FIG. 2.

FIG. 3 is a functional block diagram of the mobile device 120 illustrated in FIG. 2 that illustrates functional modules of the memory 260 shown in FIG. 2. For example, the mobile device 120 can include a lower power positioning method (LPPM) module 362, a user interface module 364, a position determination module 366, and a data access module 368. The mobile device 120 illustrated in FIGS. 2 and 3 can be used to implement the mobile device 120 associated with the processes illustrated in FIGS. 4-9.

The LPPM module 362 can be configured to implement the LPPM techniques disclosed herein in conjunction with the GNSS receiver 265. The LPPM module 362 can be configured to interface with the GNSS receiver 265 of the mobile device 120 to control power consumption associated with the GNSS receiver 265. For example, the LPPM module 362 can be configured to control when the GNSS receiver 265 conducts searches for signals from the GNSS satellite vehicles 170 (SVs). The LPPM module 362 can be configured to select a GNSS search mode in which to operate the GNSS receiver 265 of the mobile device 120. The LPPM module 362 can be configured to determine an estimated power consumption associated with execution of a GNSS search associated with one or more GNSS search modes and to select a GNSS search that does not exceed a power consumption limit specified for the GNSS receiver 265.

The LPPM module 362 can be configured such that the total incremental location power consumption (ILPC) associated with the GNSS receiver 265 of the mobile device 120 does not exceed a predetermined threshold (also referred to herein as the power consumption limit). The predetermined threshold can be determined as a maximum allowable power consumption at any time, e.g., 1 milliamp (mA), which the GNSS receiver is not allowed to exceed. The power consumption can be measured at the battery of the mobile device 120. An estimate of the power consumption by other components of the mobile device 120 can be determined and subtracted from the power consumption measured at the battery to arrive at the power consumption associated with the GNSS receiver 265. The predetermined threshold can also be specified as an average allowable power consumption over a sliding time window of a predetermined duration. For example, the predetermined threshold may be a defined as an average allowable power consumption over a sliding one-hour window of time. The predetermined threshold examples provided herein are intended to illustrate the concepts disclosed herein and are not intended to limit the predetermine thresholds to these amounts. Other predetermined thresholds may be defined.

In some implementations, the power consumption limit specified for the GNSS receiver 265 can be specified as a hard limit or a soft limit. In implementations where the power consumption limit is defined as a hard limit, the GNSS receiver 265 cannot exceed the power consumption limit when performing a GNSS search, and the LPPM module 362 can be configured to power down the GNSS receiver 265 and/or to cancel a GNSS search if the LPPM module 362 determines that operating the GNSS receiver 265 would exceed the hard limit for power consumption. In implementations where the power consumption limit is defined as a soft limit, the GNSS receiver 265 can exceed the power consumption limit specified for the GNSS receiver if necessary, but the LPPM module 362 can be configured to control the operation of the GNSS receiver 265 such that the average power consumption for the GNSS receiver 265 over a predetermine period of time remains below the power consumption limit specified for the GNSS receiver 265.

The LPPM module 362 can be configured to take into account one or more of the following factors when selecting a GNSS search mode: position uncertainty (PUNC), time uncertainty (TUNC), GNSS signal conditions, GNSS search duration, system resources available for conducting a GNSS search, size of the GNSS search window, and/or sensor information indicative of positional changes. One or more of these factors can be used to select a GNSS search mode for conducting GNSS searches that also satisfies any power consumption limit that has been specified for the GNSS receiver 265.

The LPPM module 362 can be configured to obtain position uncertainty (PUNC) and time uncertainty (TUNC) information from the GNSS receiver 265 which can be used to determine the search window that can be used to acquire signals of all of the GNSS SVs simultaneously. The position of the mobile device 120 may be uncertain if the position of the mobile device 120 has not been determined for some time or if the mobile device 120 may have moved a significant distance since the last time that the position of the mobile device 120 was determined (and thereby increasing the PUNC). The time may be uncertain if the time has not been obtained recently from the GNSS receiver 265 or from the network. The LPPM module 362 can be configured to configure the GNSS receiver 265 to operate such that the power consumption by the GNSS receiver 265 does not exceed the predetermined thresholds when maintaining the estimates of the PUNC and TUNC.

The position engine of the GNSS receiver 265 can be configured to determine the PUNC and the measurement engine of the GNSS receiver 265 can be configured to determine the TUNC. TUNC can be expressed as units of time, and the PUNC can be represented in units of distances, such as kilometers. The PUNC represents uncertainty associated with a coarse position and the TUNC represents uncertainty associated with a coarse time estimate. The coarse position and the coarse time can be determined in a number of different ways. The GNSS receiver 265 can be configured to determine the coarse position and the coarse time using multiple techniques and to select a coarse position and a coarse time that are associated with a smallest uncertainty. For example, the coarse position can be determined using signals from the terrestrial transmitters 115 and/or the macrocell base station 140. For example, the coarse position may be determined using signals from WLAN wireless access points, from the cell IDs associated with one or more macrocell base stations 140 and/or one or more terrestrial transceivers (e.g., femtocells, picocells, or microcells). The coarse position may also be propagated from a previous position fix. A coarse time estimate may also be derived from a network time and/or propagation from a previously known time in the receiver. Other techniques may also be used to obtain the coarse position and the coarse time.

The PUNC and the TUNC estimates can be used to determine a search window that the GNSS receiver 265 can use to acquire signals of all of the GNSS SVs simultaneously. The search window, in the time domain, can be determined as the summation of the GNSS receiver's clock uncertainty and the signal time-of-arrival uncertainty. The local clock uncertainty is represented as the TUNC value. The signal time-of-arrival uncertainty is dependent on the PUNC. When the position uncertainty is large, the signal time-of-arrival uncertainty will also be large.

The LPPM module 362 can be configured to operate using different GNSS search modes based on the GNSS search window and available resources for acquiring the signals of the SVs of the GNSS system or systems. In one example implementation, the LPPM module 362 is configured to implement two different GNSS search modes when the LPPM mode of the mobile device 120 is engaged, a low uncertainty mode and a high uncertainty mode. Both the low uncertainty mode and the high uncertainty mode can be used to keep the power consumption of the GNSS receiver 265 below the power consumption limit specified for the GNSS receiver 265. However, the frequency and the sensitivity of the GNSS searches performed differ between the GNSS search modes. When operating in the low uncertainty mode, the GNSS search is completed more frequently which can improve the accuracy of the position determination based on the GNSS search results, but the overall sensitivity of the search can be decreased in order to conserve power. In contrast, the when operating in the high uncertainty mode, the GNSS search is completed less frequently but at a higher sensitivity, which can be used to detect weak GNSS signals. The GNSS search associated with the high uncertainty mode consumes more power than the low uncertainty mode. Accordingly, to keep the average power consumption by the GNSS receiver 265 below the power consumption limit specified for the GNSS receiver 265, the GNSS search associated with the high uncertainty mode can be associated with a lower duty cycle than the GNSS search associated with the low uncertainty mode.

The GNSS search window associated with the low uncertainty mode is smaller than that associated with the high uncertainty mode and should require less power to execute the GNSS search for that search window than the GNSS search for the high uncertainty mode which is associated with a larger search window. Accordingly, the GNSS search associated with the low uncertainty mode may be conducted more frequently than the GNSS search associated with the high uncertainty mode because the search in the low uncertainty mode will typically consume less power than a search in the high uncertainty mode. Because the GNSS search window is smaller, the GNSS search will require less power to complete. In one example implementation to illustrate this concept, the low uncertainty mode is associated with a maximum duty cycle of $\frac{1}{40}$ Hz and is executed with a maximum total search time of 1 second, and the high uncertainty mode is executed with a maximum GNSS duty cycle of $\frac{1}{3600}$ Hz with a maximum of total search time of 20 seconds. The GNSS search in the high uncertainty mode can also be executed until a fix with accurate time and subsequently a base station time calibration is performed.

The LPPM module 362 can also be configured to take into account other factors when determining which GNSS search mode to select. For example, in some implementations, the LPPM module 362 and/or the position determination module 366 can be configured to utilize information received from the sensors 285 to determine whether the mobile device 120 is stationary or has been moved only a short distance. For example, the sensors 285 can include a pedometer that tracks how many steps that the user of the mobile device 120 has taken from a previously position of the mobile device 120. Other types of sensors 285 can also be used instead of or in addition to those discussed above to determine whether the mobile device has moved beyond a threshold distance. If the LPPM module 362 has determined that the mobile device has moved less than a predetermined distance, then the LPPM module 362 and/or the position engine of the GNSS receiver 265 can be configured to limit the growth of the PUNC since the position of the mobile device 120 does not appear to have changed beyond a predetermined threshold based on the data received from the sensors 285. If the position of the mobile device 120 has not changed, the LPPM module 362 can be configured to reduce the frequency of GNSS searches and conserve power.

The LPPM module 362 can also be configured to select a GNSS search mode based on the search frequency associated with that search mode and GNSS signal conditions. The LPPM module 362 can be configured to consider the GNSS search frequency and GNSS signal conditions in addition to or instead of the other factors discussed herein. For example, in one example implementation, the LPPM module 362 can be configured to select a duration of the GNSS search from a plurality of possible durations, such as but not limited to 80 ms, 200 ms, 400 ms, and 1000 ms, based at least in part on the GNSS signal strength as determined by the GNSS receiver 265. The LPPM module 362 can be configured to receive the GNSS signals strength information from the GNSS receiver 265. The LPPM module 362 can be configured to reduce the duration of the GNSS search responsive to the GNSS signal strength being stronger and to increase the duration of the GNSS search response to the GNSS signal strength being weaker. The LPPM module 362 can be configured to use the GNSS signal search information to determine a frequency for the GNSS searches that also meets the power consumption requirements.

The LPPM module 362 can also be configured to conform to a power budget and to select a GNSS search mode according to the power budget. The power budget can be defined as an estimate amount of power that the GNSS receiver 265 can consume over a predetermined period of time. For example, the LPPM module 362 can be configured to monitor overall power usage over a period of time and to select a new GNSS search mode that is likely to consume more or less power than a currently selected GNSS search mode in order to meet the power budget. In one example implementation, the LPPM module 362 can be configured to select a GNSS search mode that consumes more power following a period of reduced GNSS search execution and/or GNSS searches having a shorter duration. Because operating the GNSS receiver 265 in the previous GNSS search mode did not exceed the power budget, the LPPM module 362 can operate the GNSS receiver 265 using a search mode that consumes more power until the power budget is exhausted for that time period. The LPPM module 362 can be configured to reassess the GNSS search mode based on the power budget and/or the other factors discussed above and determine whether a new GNSS search mode should be selected. In implementations where the LPPM module 362 is configured to implement a power budget, the LPPM module 362 can be configured to operate the GNSS receiver 265 at a power consumption level that exceeds the power consumption limit associated with the GNSS receiver 265 so long as the power budget is satisfied.

The following example implementation illustrates how the power budget may be implemented by the LPPM module 362. The LPPM module 362 can be configured to monitor power consumption and to dynamically change the GNSS search mode under which the GNSS receiver 265 is being operated. The LPPM module 362 can be configured to operate the GNSS receiver 265 using a GNSS search mode that consumes more power in response to power consumption by the mobile device 120 falling below the power budget or to operate the GNSS receiver 265 using a GNSS search mode that consumes less power in response to power consumption by the mobile device 120 exceeding the power budget. For example, the LPPM module 362 and/or the position determination module 366 can detect that the mobile device 120 was stationary for a period of time and/or only moved a short distance which resulted in the selection of a GNSS search mode in which the frequency and/or duration of the GNSS search was decreased, thereby reducing power consumption during this period. The LPPM module 362 and/or the position determination module 366 can be configured to make such a determination using data received from the sensors 285 and/or using wireless signal measurements obtained via the wireless interface 225. The LPPM module 362 can be configured to determine how much power may be consumed to conduct searches using the GNSS receiver 265 over a predetermined period of time associated with the power budget while remaining within the power consumption limits associated with the power budget and to select a GNSS search mode that has a higher frequency and/or search duration based on this determination. The selected GNSS search mode may exceed the power consumption limit associated with the GNSS receiver 265 for at least a period of time while not exceeding the overall power budget. As a result, the LPPM module 362 may be able to provide a user of the mobile device 120 with more accurate positional information that can be used to provide more accurate navigational results and/or improved location information for other location-based services with exceeding the power budget. Accordingly, the projected battery life of the mobile device 120 may not be adversely affected or at least conform to an expected level of performance associated with the power budget while providing more accurate positional information.

While many of the example implementations provided herein include two different GNSS search modes that define different duty cycles and total search times, other implementations can include additional or different GNSS search modes that provide different duty cycles and total search times that can cause the GNSS receiver 265 to consume different amounts of power. The LPPM module 362 can be configured to select from a set of predetermined GNSS search modes that could be executed by the GNSS receiver 265 and not exceed the power consumption limit specified for the GNSS receiver 265. The LPPM module 362 can be configured to select an appropriate GNSS search mode based on the search window and resources available for searching for signals from the GNSS satellite vehicles (SVs) 170. The LPPM module 362 can determine an estimated power consumption associated with execution of a GNSS search associated with each GNSS search mode and can be configured to select a GNSS search mode that has an estimated power consumption not exceed a power consumption limit specified for the GNSS receiver 265. An example processes for selecting GNSS search mode that can be implemented by the LPPM module 362 is illustrated in FIGS. 4-9 and are discussed in detail below.

The LPPM module 362 can be configured to provide an external interface that allows the LPPM techniques to be enabled and disabled on the mobile device 120 and/or for a power consumption limit to be set for the GNSS receiver 265. The power consumption limit can be determined based on user input and/or on based on the input of one or more applications running on the mobile device 120. An application that requires more precise and/or up to date position information for the mobile device 120, such as a navigation application, may set the power consumption limit to a higher threshold than an application that does not require precise and/or up to date position information for the mobile device 120.

The interface of the LPPM module 362 can also be configured to generate an output in response to the LPPM logic of the LPPM module 362 engaging or disengaging feature-specific GNSS search modes. The interface of the LPPM module 362 can also be configured to provide an interface to receive position requests from applications or other components or modules of the mobile device 120 and to generate a position report in response to such a request. The position report can include various information related to positioning and the LPPM logic, including position information, PUNC, time information, TUNC, and other status information related to the LPPM logic. The status information can include information that specifies the availability of information required to engage the LPPM functionality. The LPPM module 362 can be configured to output the information to an application running on the mobile device 120 and/or to the user interface module 364 which can be configured to display the information on a display of the mobile device and/or otherwise output the information is a form that a user of the mobile device 120 can receive.

The LPPM module 362 can be configured to engage and/or disengage the LPPM techniques disclosed herein in response to a request from a user and/or from one or more applications. For example, a user may select a power profile from a user interface provided by the user interface module 364 of the mobile device 120 that prefers extending battery life of the battery of the mobile device 120 over performance of positioning and/or other applications of the mobile device 120. The LPPM module 362 can be configured to set the power consumption limit specified for the GNSS receiver 265 to a level that is appropriate for the desired battery life associated with the selected power profile. The LPPM module 362 can be configured to determine the power consumption limit based in part on other applications operating on the mobile device, signal conditions in the radio environment in which the mobile device 120 is currently located, and/or other considerations that may affect the amount of power consumed by the GNSS receiver 265 and/or other components of the mobile device 120. The LPPM module can also provide overrides for certain types of applications that can disengage the LPPM logic and override the power consumption limit where accurate position determination is critical. For example, the mobile device 120 can be configured such that Enhanced 911 (E911) can override the power consumption limit in order to operate the GNSS receiver 265 at whatever power level is necessary to attempt to obtain a position of the mobile device 120 in order to provide emergency responders with location information for rendering assistance to the caller. Other types of applications may have different positioning accuracy requirements and may set the power consumption limit to a different threshold value.

The LPPM module 362 can also be configured to receive asynchronous data inputs from the sensors 285 and/or other inputs that can provide navigation related data. For example, the LPPM module 362 can be configured to receive information from one or more motion sensors and/or inertial sensors that can be used to determine whether the mobile device is stationary or moving. The position determination module 366 can also be configured to receive data from one or more gyroscopic sensors that can be configured to determine an orientation of the mobile device 120. Data from other sensors, such as an altimeter, a compass, and/or other sensors configured to provide data that can be used to determine a position of the mobile device 120. The LPPM module 362 can use the sensor information and/or signal measurements obtained from the terrestrial transmitters 115 and/or the macrocell base stations 140 to determine whether a position of the mobile device 120 can be determined within an acceptable level of certainty using the sensor and/or signal information without needing to obtain GNSS measurements in order to determine a position of the mobile device 120. The LPPM module 362 can be configured to instruct the position determination module 366 to estimate a position of the mobile device 120 using the available sensor information and/or signal measurements obtained from the terrestrial transmitters 115 and/or the macrocell base stations 140 to determine the position of the mobile device 120 where using the GNSS receiver 265 would exceed the power consumption limit for the GNSS receiver 265. The position determination module 366 can be configured to augment information received from the GNSS receiver 265 with sensor information and/or signal measurements obtained from the terrestrial transmitters 115 and/or the macrocell base stations 140 where the LPPM module 362 is operating the GNSS receiver 265 in a power conserving mode and the signal quality of the GNSS signals is poor. Accordingly, the position determination module 366 may be able to estimate a position of the mobile device 120 given the information available to the position determination module 366 without needing to configure the GNSS receiver 265 to operate at a power level that would exceed the power consumption limit set for the GNSS receiver 265.

The user interface module 364 can be configured to provide a user interface that allows a user to configure (means for configuring) one or more parameters associated with the LPPM module 362. These parameters can be stored as LPPM configuration information in the memory 260 of the mobile device. The user interface module 364 can be configured to provide a user interface that allows a user to select from one or more predetermined power profiles associated with power consumption parameters for operation of the LPPM module and/or other components of the mobile device 120. The power profiles can be configured to set various operating parameters of the mobile device 120 to establish a desired battery life. For example, each predetermined power profiles can be associated with a power consumption limit for the GNSS receiver 265 and/or other components of the mobile device 120 when operating under that predetermined power profile. For example, a user of the mobile device may select from a plurality of power profiles provided by the LPPM module 362 that provide a tradeoff between performance and battery life. If the user selects a power profile associated with higher performance and shorter battery life, the power consumption limit for the GNSS receiver 265 may be set to a higher value than if the user were to select a power profile associated with lower performance but better battery life. In another example, a navigation application operating on the mobile device 120 may require a high accuracy level for positioning information and may set the power consumption limit to a higher threshold value while the navigation application is being operated on the mobile device.

The position determination module 366 can be configured to determine a position of the mobile device 120. The position determination module 366 can be configured to obtain measurements of signals from a plurality of terrestrial transmitters 115 to estimate the location of the mobile device 120 within an indoor environment in various ways. For example, the position determination module 366 can be configured to perform trilateration using signal measurements (e.g., RSSI (received signal strength indication), RTT (round-trip time)), time of arrival (TOA), and/or disambiguate between multiple possible disambiguation regions (e.g., floors) within an indoor environment, e.g., using RSSI and/or RTT measurements and known locations of the terrestrial transmitters 115 and/or macrocell base station 140. The position determination module 366 can also be configured to determine the position of the mobile device 120 using signals received from GNSS receiver 265 to determine the position of the mobile device 120 when in a location where a line of site to a satellite vehicles 170 from one or more SPS constellations are visible. The position determination module 366 can be configured to use a combination of signal measurements from the terrestrial transmitters 115, the macrocell base stations 140, and/or the satellite vehicles 170 to determine the position of the mobile device 120. The position determination module 366 can also be configured to receive information from one or more sensors of the mobile device 120 that can be used to assist the position determination module 366 in determining the position of the mobile device 120. For example, the position determination module 366 can be configured to receive information from one or more motion sensors and/or inertial that can be used to determine whether the mobile device is stationary or moving. The position determination module 366 can also be configured to receive data from one or more gyroscopic sensors that can be configured to determine an orientation of the mobile device 120. Data from other sensors, such as an altimeter, a compass, and/or other sensors configured to provide data that can be used by the position determination module 366 to determine a position of the mobile device 120.

The position determination module 366 can be configured to receive assistance data from a location server (not shown) and the position determination module 366 can be configured to use the assistance data when determining a position of the mobile device 120. The position determination module 366 can also be configured to collect signal measurements from one or more the terrestrial transmitters 115, the macrocell base stations 140, and/or the satellite vehicles 170 of one or more GNSS constellation and to provide the collected signal measurements to the location server so that the location server can determine the location of the mobile device. The position determination module 366 can also be configured to provide sensor data collected by the mobile device 120 to the location server which the location server may be able to use to assist in determining the position of the mobile device 120.

The data access module 368 can be configured to store data in the memory 260 and/or other data storage devices associated with the mobile device 120. The data access module 368 can also be configured to access data in the memory 260 and/or other data storage devices associated with the mobile device 120. The data access module 368 can be configured to receive requests from other modules and/or components of the mobile device 120 and to store and/or access data stored in the memory 260 and/or other data storage devices associated with the mobile device 120.

The LPPM module 362, in combination with one or more of the other modules and/or other components of the mobile device 120, can be configured to implement means for the various functions discussed herein. For example, the LPPM module 362 and/or other modules or components of the mobile device can provide means for managing power consumption of the GNNS receiver of the mobile device 120, which can include one or more of the following: means for deriving a GNSS search window for the GNSS receiver based on a position uncertainty (PUNC) and a time uncertainty (TUNC); means for selecting a GNSS search mode based on the GNSS search window and resources available for searching for signals from GNSS satellite vehicles (SVs), where an estimated power consumption associated with execution of a GNSS search associated with the GNSS search mode does not exceed a power consumption limit specified for the GNSS receiver; means for conducting the GNSS search using the GNSS search mode; and means for estimating a position of the mobile device based at least in part on results of the GNSS search. The LPPM module 362 and/or other modules or components of the mobile device can also implement one or more of the following means for determining the PUNC associated with the position of the mobile device, and means for selecting the GNSS search mode at least in part based on the PUNC; means for estimating the position of the mobile device based at least in part on results of the GNSS search; means for selecting the GNSS search mode from a low uncertainty mode and a high uncertainty mode, the low uncertainty mode being associated a smaller search window and a higher duty cycle, the high uncertainty mode being associated with a larger search window and a lower duty cycle; means for selecting the low uncertainty mode based at least one of sensor data information and GNSS signal strength information; means for selecting the low uncertainty mode as the GNSS search mode responsive to the estimated power consumption required to support the GNSS search window being less than or equal to the resources available for concurrently searching for signals from GNSS SVs; and means for selecting the high uncertainty mode as the GNSS search mode responsive to the estimated power consumption required to support the GNSS search window being greater than the resources available for concurrently searching for signals from GNSS SVs; means for estimating the position of the mobile device without using results of the GNSS search responsive to the estimated power consumption required to support the GNSS search window at the GNSS receiver exceeding the resources available for concurrently searching for signals from GNSS SVs by a predetermined threshold; means for receiving the power consumption limit for the GNSS receiver 265 from an application running on the mobile device; means for determining the power consumption limit specified for the GNSS receiver based on an accuracy requirement of at least one application running on the mobile device; means for obtaining additional position estimate information from at least one additional source of position related information other than the GNSS receiver; means for estimating the position of the mobile device using the results of the GNSS search and the additional position estimate information; means for obtaining additional position estimate information comprising signal information from at least one terrestrial wireless transceivers proximate to the mobile device and signal information from at least one motion sensor associated with the mobile device; means for determining whether the mobile device is receiving power from an external power source or from a batter associated with the mobile device and means for specifying a power consumption limit for the GNSS receiver 265 based at least in part on this information; means for determining whether the mobile device is receiving power from an external power source or from a batter associated with the mobile device and means for specifying a power consumption limit for the GNSS receiver 265 based at least in part on this information; means for operating the GNSS receiver 265 in a low power state in which the GNSS search is not conducted responsive to determining that the GNSS search would exceed the hard limit; means for selecting the GNSS search mode comprises selecting a GNSS search mode associated with an estimated power consumption that exceeds the power consumption limit specified for the GNSS receiver but does not exceed the power budget for the GNSS receiver; and means for receiving a user input from an application running on the mobile device and for setting the power consumption limit based at least in part on the input from the user.

Example Implementations

Figure 4:
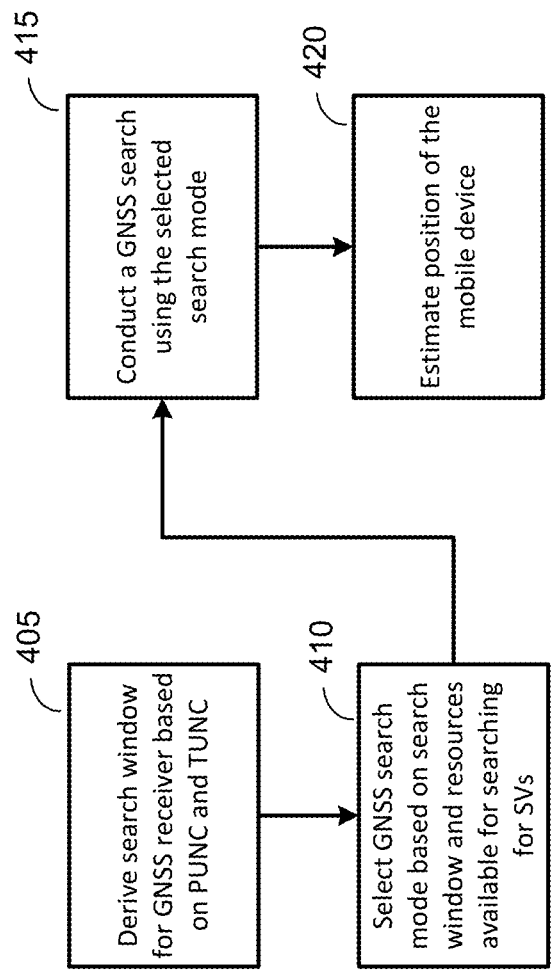
FIG. 4 is a flow diagram of a process for managing power consumption of a GNSS receiver of a mobile device.

FIG. 4 is a flow diagram of a process for managing power consumption of a GNSS receiver of a mobile device. The process illustrated in FIG. 4 can be implemented by the mobile device 120 discussed above. The LPPM module 362 of the mobile device can be configured to perform the steps associated with FIG. 4 unless otherwise noted. Some steps may also be performed by the position determination module or the GNSS receiver 265 of the mobile device 120. The process illustrated in FIG. 4 can be performed if the LPPM functionality of the mobile device 120 is activated. As discussed above, the LPPM functionality of the mobile device 120 can be activated in response to a user request and/or in response to a request from one or more applications operating on the mobile device 120.

A GNSS search window for the GNSS receiver can be determined based on the position uncertainty (PUNC) and a time uncertainty (TUNC) maintained by the receiver (stage 405). The size of the search window to be used by the GNSS receiver can depend on the position uncertainty (PUNC) associated with the position of the mobile device 120. The position of the mobile device 120 may not have been determined recently and/or the mobile device 120 may have moved a significant distance since the last time that the position of the mobile device 120 has been determined. The time uncertainty (TUNC) associated with the mobile device 120 is related to the amount of time that the GNSS receiver may need to listen for signals from a GNSS SV. Signals from the SV take time to propagate to the mobile device 120 and that time is dependent upon how far the SV is from the mobile device 120. If the position of the mobile device 120 is uncertain, this introduces uncertainty with respect to how long the GNSS receiver will need to listen to acquire the signal for the GNSS SV.

A GNSS search mode can then be selected for the GNSS receiver 265 (stage 410). In some implementations, the GNSS search mode can be selected based on the search window and resources available for searching for signals from GNSS satellite vehicles (SVs) 170 and/or other factors discussed below. In some implementations, the GNSS search mode may be selected from a low uncertainty mode, a high uncertainty mode, and a no-search or alternate search mode. In other implementations, the GNSS search mode can be selected from a plurality of GNSS search modes. Each of the GNSS search modes can be associated with different search frequencies, search window sizes, and/or durations. The LPPM module 362 can be configured to select a GNSS search mode that satisfies a power consumption limit that has been specified for the GNSS receiver 265. One or more of the following factors can be taken into account when selecting a GNSS search mode: position uncertainty (PUNC), time uncertainty (TUNC), GNSS signal conditions, GNSS search duration, system resources available for conducting a GNSS search, size of the GNSS search window, and/or sensor information indicative of positional changes. Other factors discussed herein may also be considered when selecting the GNSS search mode. One or more of these factors can be used to select a GNSS search mode for conducting GNSS searches that also satisfies any power consumption limit that has been specified for the GNSS receiver 265.

In one example implementation, the low uncertainty mode is associated with a smaller search window than the high uncertainty mode and requires less power than the high uncertainty mode. The GNSS search mode can be selected from the low uncertainty mode and the high uncertainty mode based on the search window and resources available for searching for signals from GNSS SVs.

In one example implementation, the selection of the low uncertainty mode or the high uncertainty mode can be made taking into account the size of the search window and the available system resources for conducting a search. A determination of estimated resources required to support the GNSS search window at the GNSS receiver can be determined. For example, in one implementation, the GNSS engine of the GNSS receiver 265 is configured to periodically compute the total code & Doppler search space, where the search window W represents the total code and Doppler search space required to acquire all GNSS SVs simultaneously, and where S represents the total search capacity for the GNSS engine of the GNSS receiver 265. W and S can be expressed as units of time, such as microseconds. W can represent the total time uncertainty associated with all of the visible SVs, and S can represent the time domain associated with the total search capacity of the GNSS engine of the GNSS receiver 265. TUNC can be expressed as units of time, and the PUNC can be represented in units of distances, such as kilometers.

The LPPM module 362 can be configured to select an appropriate search mode based on the search window and the resources available for conducting the search. In one example implementation, if the W<S, then the LPPM module 362 can be configured to select the low uncertainty mode for operating the GNSS receiver 265. When operating in the low uncertainty mode, the GNSS search can be completed more often but the overall sensitivity of the search may be decreased in order to conserve power and to keep power consumption below a power consumption limit associated with the GNSS receiver 265. The LPPM module 362 can be configured to continue to operate the GNSS receiver 265 in the low uncertainty mode while the PUNC and the TUNC to be remain below predetermined thresholds associated with each of these uncertainty values. If the PUNC and/or TUNC exceeds these predetermined thresholds, the LPPM module 362 can be configured to operate in the high uncertainty mode or another uncertainty mode which has a higher duty cycle but may have a decreased overall sensitivity in order to keep the average power consumption associated with the GNSS receiver 265 below the power consumption limit GNSS receiver 265.

While the example implementation described above includes only a low uncertainty mode and a high uncertainty mode, other implementations from which the GNSS search mode may be selected from a plurality of search modes and the techniques discussed herein are not limited to only a low uncertainty mode and a high uncertainty mode. Example processes for selecting a GNSS search mode are illustrated in FIG. 5-9 and are described in detail below. Furthermore, in some situations, no GNSS search may be performed. For example, if the size of the GNSS search window exceeds the predetermined portion of the total search capacity of the GNSS engine.

Other factors can also be considered when determining a GNSS search mode. For example, the LPPM module 362 and/or the position determination module 366 can be configured to utilize information received from the sensors 285 to determine whether the mobile device 120 is stationary or has been moved only a short distance and to limit the growth of the PUNC since the uncertainty in the position of the mobile device 120 should not change significantly if the device is stationary or has only moved a short distance. If the position of the mobile device 120 has not changed, the LPPM module 362 can be configured to reduce the frequency of GNSS searches and conserve power.

The GNSS search mode can also or alternatively be selected based on a search frequency associated with that search mode and that is appropriate for the GNSS signal conditions. For example, the search frequency and/or the search duration may be reduced where the GNSS signals strength is stronger than a first threshold and the search frequency and/or the search frequency may be increased responsive to the GNSS signal strength being less than a second threshold. As the GNSS signal conditions change over time, the LPPM module 362 can be configured to select a new GNSS search mode having a search duration and/or search frequency that is more appropriate the new GNSS signal conditions. Accordingly, the frequency and/or duration of the GNSS search frequency may be adjusted according to the GNSS signal conditions but the LPPM module 362 can be configured to select a shortest search duration and/or frequency for the current GNSS signal conditions that also does not exceed the power consumption limit associated with the GNSS receiver 265 (if any).

A GNSS search using the selected search mode can then be conducted (stage 415). The LPPM module 362 can be configured to configure the GNSS receiver to operate according to the operating parameters defined for the selected GNSS search mode. Some example operating parameters associated with each of the GNSS search modes are discussed above. While the example implementations provided herein include two different GNSS search modes that define different duty cycles and total search times, other implementations can include additional or different GNSS search modes that provide different duty cycles and total search times that are associated with different estimated power associated with execution of a GNSS search associated with the GNSS search mode does not exceed a power consumption limit specified for the GNSS receiver 265.

A position of the mobile device 120 can then be determined (stage 420). The position of the mobile device can be determined by the position determination module 366 in response to a request from the LPPM module 362. The position of the mobile device 120 can be determined using signals obtained from signals from SVs obtained during the GNSS search and/or signals from one or more terrestrial transmitters 115, one or more macrocell base stations 140, and/or sensors associated with the mobile device 120.

Figure 5:
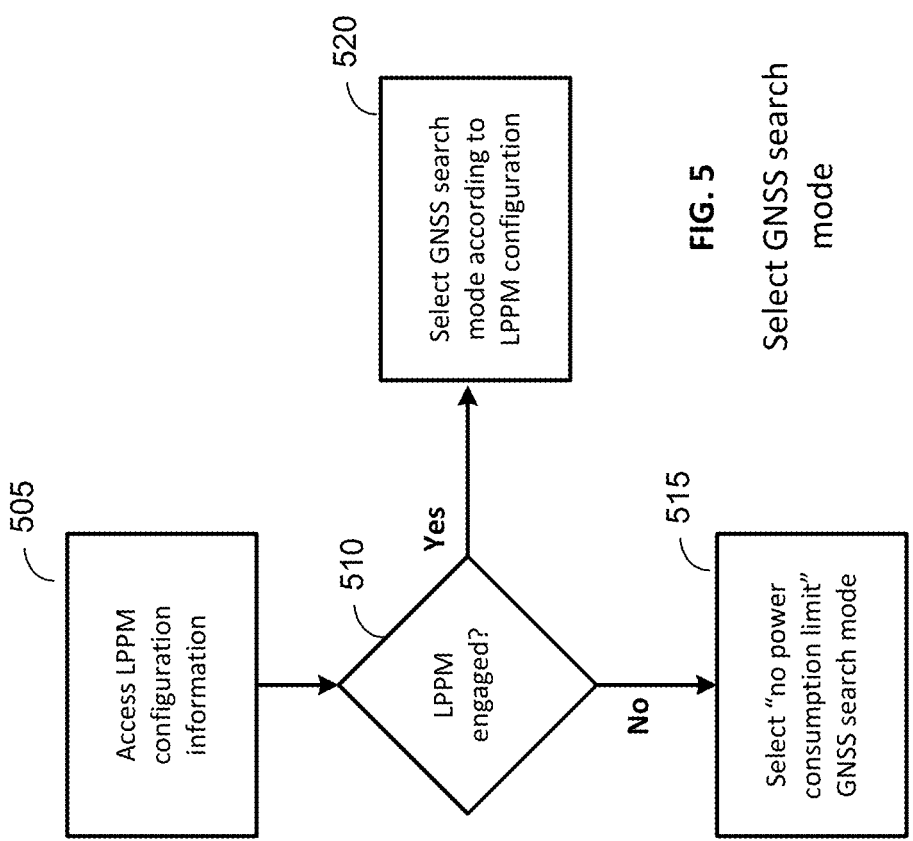
FIG. 5 is a flow diagram of a process for selecting a GNSS search mode.

FIG. 5 is a flow diagram of a process for selecting a GNSS search mode. The process illustrated in FIG. 5 can be implemented by the mobile device 120 discussed above. The LPPM module 362 of the mobile device can be configured to perform the steps associated with FIG. 5 unless otherwise noted. The process illustrated in FIG. 5 can be used to implement stage 410 of the process illustrated in FIG. 4. In some implementations, the order in which the stages of the process illustrated in the example illustrated FIG. 5 and one or more of the stages of the process may be omitted and other stages may be included that are not shown in FIG. 5.

LPPM configuration information can be accessed (stage 505). The LPPM configuration information may be stored in the memory 260 of the mobile device 120, and the LPPM module 362 can be configured to request the LPPM configuration information from the data access module 368 which can access the memory 260 to retrieve the LPPM configuration information. The LPPM configuration information can include parameters used by the LPPM module 362 for configuring the operation of the LPPM techniques disclosed herein. The LPPM configuration information can include a parameter that indicates whether the LPPM functionality is engaged or disengaged. The LPPM module 362 can be configured to provide an interface that allows the LPPM functionality of the mobile device 120 to be engaged or disengaged. The mobile device 120 can include a user interface provided by the user interface module 364. The LPPM module 362 can provide an API that allows one or more applications on the mobile device to engage or disengage the LPPM functionality. The LPPM module 362 can also be configured to receive a power profile selection from one or more applications. For example, the mobile device 120 may include a navigation application that requires very accurate positioning information that can be configured to disable the LPPM functionality in order to provide a good user experience while potentially sacrificing battery life of the mobile device 120. The LPPM information may also include information that indicates that the LPPM functionality has been engaged and that a particular power profile has been selected from a plurality of power profiles. The power profile may have been selected by a user of the mobile device, by the LPPM module 362, or by an application running on the mobile device 120. The LPPM configuration information can also define a power consumption limit for the GNSS receiver 265 and/or other components of the mobile device 120. The power consumption limit may be associated with a power profile and/or may be defined by an application running on the mobile device 120 or may be determined based on user input. For example, a user of the mobile device 120 may select a power profile that may provide higher location accuracy with potentially decreased battery life or may select a power profile that provides longer battery life but may provide lower location accuracy.

A determination whether LPPM is engaged can be made (stage 510). The LPPM module 362 can determine whether the LPPM functionality has been engaged or disengaged based on the LPPM configuration accessed in stage 510. If the LPPM functionality is not engaged, the LPPM module 362 can be configured to operate the GNSS receiver in a "no power consumption limit" mode in which the LPPM module 362 does not control the duty cycle and/or monitor the power consumption of the GNSS receiver 265. If the LPMM functionality is engaged, a GNSS search mode can be selected according to the LPPM configuration information (stage 520). The LPPM module 362 can be configured to select an appropriate power profile for operating the GNSS receiver 265 if the LPPM configuration information indicates that the LPPM functionality has been engaged. Example processes that can be used for selecting a GNSS search mode are illustrated in FIGS. 6 and 7.

Figure 6:
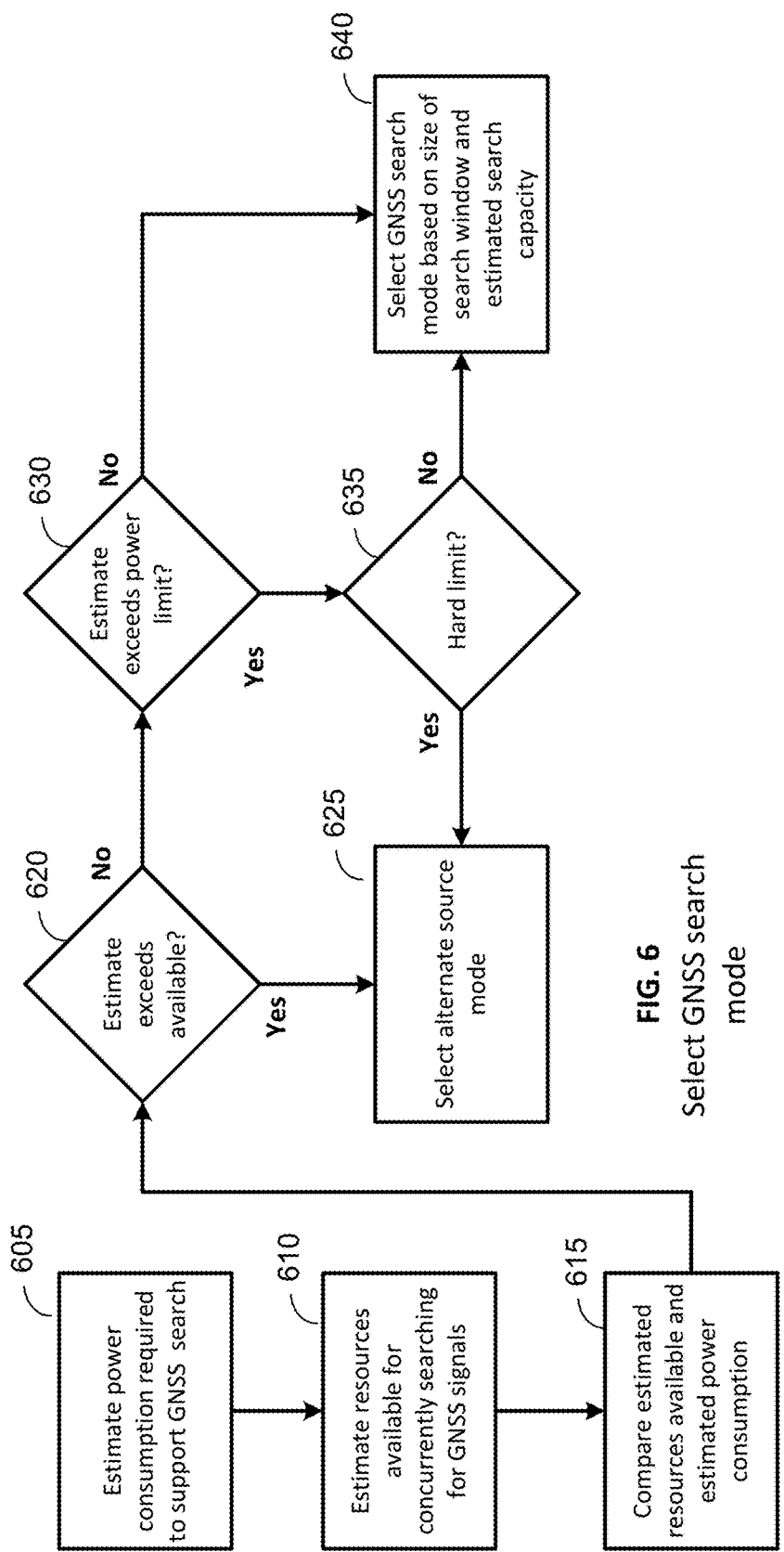
FIG. 6 is a flow diagram of another process for selecting a GNSS search mode.

FIG. 6 is a flow diagram of a process for selecting a GNSS search mode. The process illustrated in FIG. 6 can be implemented by the mobile device 120 discussed above. The LPPM module 362 of the mobile device can be configured to perform the steps associated with FIG. 6 unless otherwise noted. Some steps may also be performed by the position determination module or the GNSS receiver 265 of the mobile device 120. The process illustrated in FIG. 6 can be used to implement stage 410 of the process illustrated in FIG. 4 or stage 520 of the process illustrated in FIG. 5. In some implementations, the order in which the stages of the process illustrated in the example illustrated FIG. 6 and one or more of the stages of the process may be omitted and other stages may be included that are not shown in FIG. 6.

A power consumption required to support GNSS search window can be estimated (stage 605). The LPPM module 362 can be configured to use the GNSS search window information derived from the PUNC and the TUNC to estimate the resources that would be required to perform the search. Other considerations, such as the type of GNSS receiver included in the mobile device 120 can also be considered when estimating the power consumption required to support the GNSS search window. For example, for a given GNSS receiver, the unit power cost of the may be well defined by the search window size and the duration of the search, and the LPPM module 362 can be configured to access this information to determine an estimate of the power consumption required to support the GNSS search window. For example, the power consumption information for the GNSS receiver may be stored in the memory 260 of the mobile device 120 and the LPPM module 362 can be configured to access this information from the memory 260. Another consideration that the LPPM module 362 can take into consideration when estimating the resource that would be required to conduct a GNSS search is GNSS search acquisition integration time. The GNSS search acquisition integration time can be expressed as a unit of time, e.g. in seconds, and the LPPM module 362 can be configure to select different integration times for the GPS receiver 265 in order to adjust the power consumption of the receiver. Increasing the GNSS search acquisition integration time can increases the time that the GNSS receiver 265 is powered on and can conduct an integration search. Accordingly, power consumption of the GNSS receiver 265 can be adjusted by adjusting the GNSS search acquisition integration time, but a shorter GNSS search acquisition integration time can result in decreased sensitivity. Decreasing the sensitivity can result in the GNSS receiver 265 being unable to acquire a weaker GNSS signal. For example, operating the GNSS receiver 265 with a 1 second GNSS search acquisition integration time would be likely to result in the in the GNSS receiver 265 consuming less power than operating the GNSS receiver 265 using a 3 second GNSS search acquisition integration time. In some implementations, the LPPM module 362 can be configured to select a GNSS search mode based on the power consumption limit associated with the GNSS receiver 265 and the GNSS search window. The LPPM module 362 can then select a GNSS search acquisition integration time based on the GNSS search mode selected, the power consumption limit, and the GNSS search window. Accordingly, the LPPM module 362 may not achieve a specific sensitivity target and may instead provide a "best effort" sensitivity based on the factors discussed above.

An estimate of resources available for concurrently searching for GNSS signals can be determined (stage 610). The estimate of the resources available for conducting the search for GNSS signals can be determined based on various parameters associated with the mobile device 120. For example, the estimated resources can take into account any applications that are currently operating on the mobile device, the current battery charge levels, projected battery requirements to support any currently running applications or processes and/or applications or processes that are scheduled to run on the mobile device 120. The LPPM module 362 can also be configured to take into account available memory on the mobile device 120, processors computation cycles, and/or data transmission bandwidth/bus bandwidth that are currently allocated to the GNSS receiver 265. The estimate of resources available conducting the search for GNSS signals can be expressed in terms of a total search capacity for the GNSS receiver 265 given the various constraints on the resources of the mobile device 120 as how much of those resources can be devoted to performing the GNSS search.

The estimated resources available and estimated power consumption can be compared (stage 615). The LPPM module 362 of the mobile device can be configured to compare the estimated resources available and the estimated power consumption. A determination can be made whether the estimated power consumption required to support the GNSS search exceeds the available resources of the mobile device 120 (stage 620). If the estimated power consumption associated with the GNSS search exceeds the available resources on the mobile device, the LPPM module 362 can be configured to not conduct a GNSS search. The LPPM module 362 can be configured to not take into account any power consumption limit that has been defined for the mobile device 120 when determining whether there are sufficient resources to perform the GNSS search. The LPPM module 362 can be configured to consider the power consumption limit when determining which GNSS search mode to select.

If the estimated power consumption required to support the GNSS search exceeds the available resources of the mobile device 120, an alternate source mode can be selected for determining the location of the mobile device 120 (stage 625). The LPPM module 362 can be configured to operate using an alternative source mode to obtain information that can be used to determine the location of the mobile device. For example, the LPPM module 362 can be configured to instruct the position determination module 366 to obtain assistance data from one or more network servers, such as a location server. The LPPM module 362 can also be configured to instruct the position determination module 366 to use signals from one or more wireless transmitters, such as wireless local area network (WLAN) wireless access points, wireless wide area network (WWAN) base stations, and/or other wireless transmitters having a known location that can be used to determine the location of the mobile device 120 based on signal measurements of signals transmitted by the wireless transmitters. The LPPM module 362 can also be configured to instruct the position determination module 366 to send the wireless measurements to a location server which can in turn determine the position of the mobile device 120. The LPPM module 362 can also be configured to use other positioning technique that do not require signals from one or more GNSS satellite vehicles to determine the location of the mobile device 120.

If the estimated power consumption required to support the GNSS search does not exceed the available resources of the mobile device 120, a determination can be made whether the estimated power consumption exceeds a power consumption limit associated with the GNSS receiver 265 of the mobile device (stage 630). In some implementations, the power consumption limit can specify how much power may be consumed by the GNSS receiver 265 of the mobile device at any one time. In other implementations, the power consumption limit can be used to specify a total amount of power that may be consumed by the mobile device 120 as a whole over a predetermined period of time. For example, the power consumption limit can be defined as an average power consumption limit for either GNSS receiver 265 or for the mobile device 120 as a whole over a predetermined period of time. The power consumption limit may be determined for the mobile device 120 in a variety of ways. The power consumption limit may be defined by an application running on the mobile device. For example, the mobile device 120 may include a power management application that allows a user of the mobile device to select a power profile for the mobile device that can be used to configure various operating parameters of the mobile device. Some power profiles may favor longer battery life by controlling and/or reducing the power consumption by various components of the mobile device 120, such as the GNSS receiver 265. Other power profiles may favor performance over battery life by allowing components of the mobile device 120, such as the GNSS receiver 265, to use available processing and power resources to provide at least a minimum level of performance associated with each of the power profiles. The power consumption limits can also be defined by an application running on the mobile device. For example, the LPPM module 362 can be configured to associate certain applications, such as e-911 applications, with a power consumption limit that allows the application to make full use of the all available resources, because the application is intended to be used to locate the mobile device 120 in the event of an emergency and requires very accurate position information. In contrast, the LPPM module 362 may be configured to associate other applications, such as navigation applications, with a power consumption limit that is somewhat less that that associated with the e-911 application. A navigation application may obtain position information from the GNSS receiver 265 and could require frequent position updates and very accurate position determination, but the performance of the navigation application can be balanced with the overall power consumption by the mobile device 120 and the navigation application may be associated with a power consumption limit that is lower than that of the e-911 application. The LPPM module 362 can also be configured to specify a power consumption limit for one or more applications based on whether the mobile device 120 is receiving power from an external power source or from a battery associated with the mobile device 120. The LPPM module 362 can be configured to associate higher power consumption limits where the mobile device 120 is receiving power from an external power source, and the LPPM module 362 can also be configured to disable to LPPM techniques where the mobile device 120 is receiving power from an external power source.

If the estimated power consumption required to support the GNSS search exceeds the power consumption limit associated with the GNSS receiver 265 of the mobile device 120, a determination can be made whether the power consumption limit is a hard threshold that cannot be exceeded (stage 635). Where the power consumption limit is defined as a hard limit, the LPPM module 362 can be configured to operate the GNSS receiver 265 and/or other components of the mobile device 120, such that the estimated power consumption for GNSS receiver 265 and/or the other components of the mobile device 120 does not exceed the power consumption limit. If the power consumption limit is a hard limit that cannot be exceeded, the process can continue with stage 625 where an alternate source mode can be selected for determining the location of the mobile device 120 as described above. The LPPM module 362 can be configured to operate GNSS receiver 265 in a low power state in which a GNSS search is not conducting using the GNSS receiver 265, and the position determination module 366 can be configured to obtain positioning information from alternative sources that may be used to estimate the position of the mobile device. Otherwise, if the threshold is not a hard threshold, then the process can proceed to stage 640. In some implementation where the power consumption limit is not a hard limit, the power consumption limit can be associated with an overshoot amount that determines much the estimated power consumption may exceed the power consumption limit. In some implementations, the overshoot amount can be expressed as a percentage of the power consumption limit and can be a predetermined percentage that is applied to all GNSS search mode selection. In other implementations, the overshoot amount may be defined based on the types of applications that are operating on the mobile device that may require location information and an accuracy level of the data required by the applications.

A GNSS search mode can be selected based on size of search window and estimated search capacity (stage 640). The LPPM module 362 can be configured to select a GNSS search mode based on the size of the search window and based on the estimated search capacity of the mobile device 120. In some implementations, the LPPM module 362 is configured to select from a low certainty mode and a high certainty mode. In other implementations, the LPPM module 362 is configured to select from a multiple GNSS search modes, and the GNSS search modes can be associated with varying levels of certainty. FIG. 7 illustrates an example of a process that can be used to select a GNSS mode where a high certainty and a low certainty mode are available. FIG. 8 illustrates an example of a process that can be used to select from multiple GNSS search modes.

FIG. 7 is a flow is a flow diagram of a process for selecting a GNSS search mode from a low uncertainty search mode and a high uncertainty search mode. The process illustrated in FIG. 7 can be implemented by the mobile device 120 discussed above. The LPPM module 362 of the mobile device can be configured to perform the steps associated with FIG. 7 unless otherwise noted. Some steps may also be performed by the position determination module 366 or the GNSS receiver 265 of the mobile device 120. The process illustrated in FIG. 7 can be used to implement stage 410 of the process illustrated in FIG. 4, stage 520 of the process illustrated in FIG. 5, or stage 640 of the process illustrated in FIG. 6. In some implementations, the order in which the stages of the process illustrated in the example illustrated FIG. 7 and one or more of the stages of the process may be omitted and other stages may be included that are not shown in FIG. 7. The example process illustrated in FIG. 7 is configured to select from a high certainty mode and a low uncertainty mode for operating the GNSS receiver 265.

GNSS search mode selection criteria can be accessed (stage 705). The LPPM module 362 can be configured to access GNSS search mode selection criteria that can be used to determine which GNSS search mode should be selected based on various parameters, such as the size of the search window derived based on the PUNC and the TUNC, the resources available for conducting the GNSS search, and/or other parameters, such as whether the mobile device 120 is connected to an external power source. The GNSS search mode selection criteria can be stored in memory 260 of the mobile device, and the LPPM module 362 can request that the data access module 368 retrieve the GNSS search mode selection criteria from the memory 260 of the mobile device 120. In some implementations, the GNSS search mode selection criteria can be stored in the memory 260 of the mobile device 120 by the manufacturer of the mobile device. In other implementations, the GNSS search mode selection criteria may be stored in the memory 260 of the mobile device 120 by a wireless carrier associated with the mobile device. The GNSS search mode selection criteria may be stored in the memory 260 of the mobile device 120 at the time that the mobile device 120 is configured to operate with the wireless network provided by the wireless carrier. The GNSS search mode selection criteria can also be pushed to the mobile device 120 by the mobile carrier via the wireless network for storage in the memory 260 of the mobile device 120. In some implementations, the mobile device 120 can also be configured to contact a remote server, which may or may not be part of the wireless network provided by the mobile carrier associated with the mobile device, download the GNSS search mode selection criteria to the mobile device 120.

A determination can be made whether the GNSS search mode criteria for the low uncertainty mode has been satisfied (stage 710). In one example implementation, the GNSS search mode criteria for selecting a GNSS search mode from the low uncertainty mode and the high uncertainty mode can be expressed as follows: W<S, where the search window W represents the total code and Doppler search space required to acquire all GNSS SVs simultaneously, and where S represents the total search capacity for the GNSS engine of the GNSS receiver 265. If the size of the search window W is less than the size of the total search capacity S of the GNSS receiver 265, then the GNSS search mode criteria for selecting the low uncertainty mode has been satisfied. Otherwise, if the size of the search window W is not less than the available search capacity, the GNSS search mode criteria for selecting the low uncertainty mode has not been satisfied and the high uncertainty search mode will be selected. In other example implementations, the GNSS search mode criteria for selecting a GNSS search mode can take into account considerations such as the PUNC and the TUNC. For example, the LPPM module 362 can be configured to select an appropriate search mode based on the search window and the resources available for conducting the search. In one example implementation, if the W<S, then the LPPM module 362 can be configured to select the low uncertainty mode for operating the GNSS receiver 265. When operating in the low uncertainty mode, the GNSS search can be completed more often but the overall sensitivity of the search may be decreased in order to conserve power and to keep power consumption below a power consumption limit associated with the GNSS receiver 265. The LPPM module 362 can be configured to continue to operate the GNSS receiver 265 in the low uncertainty mode while the PUNC and the TUNC to be remain below predetermined thresholds associated with each of these uncertainty values. If the PUNC and/or TUNC exceeds these predetermined thresholds, the LPPM module 362 can be configured to operate in the high uncertainty mode or another uncertainty mode which has a higher duty cycle but may have a decreased overall sensitivity in order to keep the average power consumption associated with the GNSS receiver 265 below the power consumption limit GNSS receiver 265.

If the GNSS search mode criteria for low uncertainty mode has been satisfied, the LPPM module 362 can select the low uncertainty GNSS search mode (stage 715). When operating in the low uncertainty mode, the GNSS receiver 265 the frequency of the GNSS search can be conducted more often than when the GNSS receiver 265 is operating in the high uncertainty mode. However, the overall sensitivity of the search may be lower when operating in the low uncertainty mode rather than the high uncertainty mode. Otherwise if the GNSS search mode criteria for low uncertainty mode has not been satisfied, the LPPM module 362 can select the high uncertainty GNSS search mode (stage 720). When operating in the high uncertainty mode, the GNSS receiver 265 the frequency of the GNSS search can be conducted less often than when the GNSS receiver 265 is operating in the low uncertainty mode. The overall sensitivity of the search may be higher when operating in the high uncertainty mode rather than the low uncertainty mode. The low uncertainty mode or the high uncertainty mode can be selected based on the whether the GNSS search mode criteria have been satisfied, which may include considerations such as the size of the GNSS search window, the PUNC, the TUNC, and/or other considerations. Both the low uncertainty mode and the high uncertainty mode can be configured to keep the overall power consumption of the GNSS receiver 265 below the power consumption limit specified for the GNSS receiver 265.

FIG. 8 is a flow is a flow diagram of a process for selecting a GNSS search mode from multiple GNSS search modes. The process illustrated in FIG. 8 can be implemented by the mobile device 120 discussed above. The LPPM module 362 of the mobile device can be configured to perform the steps associated with FIG. 8 unless otherwise noted. Some steps may also be performed by the position determination module 366 or the GNSS receiver 265 of the mobile device 120. The process illustrated in FIG. 8 can be used to implement stage 410 of the process illustrated in FIG. 4, stage 520 of the process illustrated in FIG. 5, or stage 640 of the process illustrated in FIG. 6. In some implementations, the order in which the stages of the process illustrated in the example illustrated FIG. 8 and one or more of the stages of the process may be omitted and other stages may be included that are not shown in FIG. 8. The example process illustrated in FIG. 8 is configured to select from a high certainty mode and a low uncertainty mode for operating the GNSS receiver 265.

GNSS search mode selection criteria can be accessed (stage 805). The LPPM module 362 can be configured to access GNSS search mode selection criteria that can be used to select a GNSS search mode. The GNSS search mode selection criteria can associate each of a set of search modes with criteria that the LPPM mode 362 can use to determine which GNSS search mode (if any) to select. The GNSS search mode selection criteria can define one or more GNSS search modes and the selection criteria that can be used to determine which of the GNSS search modes to use. The GNSS search mode selection criteria can also define criteria that can be used to determine circumstances under which no GNSS search should be conducted. The selection criteria can include the estimated size of the GNSS search window, the estimated resources available for conducting the GNSS search, the PUNC, the TUNC, the power consumption limit, and/or other criteria that can be used to determine that a particular GNSS search mode may be most effective in acquiring measurements of signals from the GNSS satellites 170 that can be used to determine a position of the mobile device while maintaining the power consumption associated with the GNSS receiver 265 below the power consumption limit.

The GNSS search mode selection criteria can be compared to GNSS information (stage 810). The GNSS search information can include information associated with conducting the GNSS search and/or information about the GNSS receiver 265. For example, the GNSS information can include the GNSS search window, the PUNC, the TUNC, the estimated amount of resources required to conduct the GNSS search, the available resources for conducting the GNSS search, and/or other information. The GNSS information may also include information about the type of GNSS receiver 265 included in the mobile device 120, which can be used to estimate the power consumption associated with the GNSS receiver 265. The GNSS information may be determined in part by the LPPM module 265 using the various processes described herein. Some of the GNSS information may be accessed from the memory 260 of the mobile device 120, such as configuration information and/or information identifying the type of GNSS receiver 265 included in the mobile device 120.

A GNSS search mode can be selected based on the results of the comparison (stage 815). The LPPM module 362 can be configured select a GNSS search mode from the multiple GNSS search modes associated with the GNSS search mode selection criteria based on the comparison of the GNSS information. The LPPM module 362 can compare the GNSS information with the GNSS selection mode criteria to determine whether the selection mode criteria associated with any of the GNSS search modes included in the GNSS search mode selection criteria have been satisfied. If more than one of the GNSS search mode selection criteria have been satisfied for more than one GNSS search mode, the LPPM module 362 can be configured to select a GNSS search mode with a higher duty cycle that operates the GNSS receiver 265 more frequently than the other GNSS search modes associated with the GNSS search mode criteria that were satisfied. In other implementations, the LPPM module 362 can be configured to select a GNSS search mode with a more infrequent duty cycle but may provide increased sensitivity.

FIG. 9 is a flow diagram of a process for conducting a position determination for a mobile device 120 using an alternative source mode which uses position information from sources other than GNSS receivers. The process illustrated in FIG. 9 can be implemented by the position determination module 366 and/or other modules of the mobile device 120. The process illustrated in FIG. 9 can be used to estimate a position of the mobile device 120 if the LPPM module 362 determines that no GNSS search is to be conducted. This may also be referred to as operating the position determination module 366 and/or other modules of the mobile device in an alternate source mode where the position of the mobile device 120 is estimated using information that is not received from the GNSS receiver 265. The method illustrated in FIG. 9 can be used to implement stage 420 of the process illustrated in FIG. 4, and may be used to estimate the position of the mobile device 120 following stage 625 of the process illustrated in FIG. 6.

Position related information can be obtained from at least one source other than a GNSS receiver (stage 905). The position determination module 366 can be configured to estimate the location of the mobile device 120 using information from sources other than the GNSS receiver 265. For example, the position determination module 366 can be configured to measure signals from one or more wireless base stations, such as the terrestrial transmitter 115 and the macrocell base station 140, and obtain timing measurements (e.g., for time of arrival (TOA) or observed time difference of arrival (OTDOA)), signal strength measurements, and/or signal quality measurements for the wireless base stations. The position determination module 366 can be configured to use this information to estimate the location of the mobile device 120 and/or to obtain additional information from one or more network entities. For example, the position determination module 366 can be configured to obtain assistance data from a location server or other network-connected device that the position determination module 366 can use to estimate the position of the mobile device 120. The position determination module 366 can also be configured to use other non-GNSS sources of position information to estimate the location of the mobile device 120, including signals from one or more sensors 285.

The position of the mobile device 120 can be estimated using the position related information (stage 910). The position determination module 366 can be configured to determine estimate the position of the mobile device using the position related information. In some implementations, the position determination module 366 can be configured to send the position related information to a location server or other network-connected device that is configured to determine the position of the mobile device 120 using the position related information and/or other information that may be provided by the mobile device 120 and/or obtained by the location server or other network-connected device. The position determination module 366 can be configured to receive a location estimate of the mobile device 120 from the location server or other network-connected device and can be configured to provide the location information to an application on the mobile device 120 and/or another module of the mobile device 120 that has requested a position of the mobile device 120.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for managing power consumption of a Global Navigation Satellite System (GNSS) receiver of a mobile device, the method comprising:
deriving a GNSS search window for the GNSS receiver based on a position uncertainty (PUNC) and a time uncertainty (TUNC), the PUNC being determined at least in part by sensor data indicating whether the mobile device is stationary or has moved less than a predetermined threshold distance from a last known position;
selecting a GNSS search mode based on the GNSS search window and resources available for searching for signals from GNSS satellite vehicles (SVs), wherein an estimated power consumption associated with execution of a GNSS search associated with the GNSS search mode does not exceed a power consumption limit specified for the GNSS receiver;
conducting the GNSS search using the GNSS search mode; and
estimating a position of the mobile device based at least in part on results of the GNSS search.

2. The method of claim 1, further comprising:
determining the PUNC associated with the position of the mobile device, wherein determining the PUNC associated with the position of the mobile device comprises determining a coarse position of the mobile device using multiple position determination techniques and selecting a coarse position having a smallest PUNC, and
wherein selecting the GNSS search mode based on the GNSS search window and the resources available for searching for signals from SVs comprises selecting the GNSS search mode at least in part based on the PUNC.

3. The method of claim 1, wherein estimating the position of the mobile device comprises estimating the position of the mobile device based at least in part on results of the GNSS search.

4. The method of claim 1, wherein the power consumption limit specified for the GNSS receiver comprises an average power consumption limit over a predetermined period of time.

5. The method of claim 1, wherein selecting the GNSS search mode comprises selecting the GNSS search mode from a low uncertainty mode and a high uncertainty mode, the low uncertainty mode being associated a smaller search window and a higher duty cycle, the high uncertainty mode being associated with a larger search window and a lower duty cycle.

6. The method of claim 5 wherein selecting the GNSS search mode from the low uncertainty mode and the high uncertainty mode based on the GNSS search window and the resources available for searching for signals from GNSS SVs comprises selecting the low uncertainty mode based on the sensor data indicating that the mobile device is stationary or has moved less than a predetermined threshold distance from a last known position.

7. The method of claim 5, wherein selecting the GNSS search mode from the low uncertainty mode and the high uncertainty mode based on the GNSS search window and the resources available for searching for signals from GNSS SVs comprises:
selecting the low uncertainty mode as the GNSS search mode responsive to the estimated power consumption required to support the GNSS search window being less than or equal to the resources available for concurrently searching for signals from GNSS SVs; and
selecting the high uncertainty mode as the GNSS search mode responsive to the estimated power consumption required to support the GNSS search window being greater than the resources available for concurrently searching for signals from GNSS SVs.

8. The method of claim 7, further comprising:
estimating the position of the mobile device without using results of the GNSS search responsive to the estimated power consumption required to support the GNSS search window at the GNSS receiver exceeding the resources available for concurrently searching for signals from GNSS SVs by a predetermined threshold.

9. The method of claim 1, wherein estimating the position of the mobile device using results of the GNSS search further comprises:
obtaining additional position estimate information from at least one additional source of position related information other than the GNSS receiver; and
estimating the position of the mobile device using the results of the GNSS search and the additional position estimate information.

10. The method of claim 9, wherein the additional position estimate information comprises at least one of signal information from at least one terrestrial wireless transceivers proximate to the mobile device and signal information from at least one motion sensor associated with the mobile device.

11. The method of claim 1, wherein the power consumption limit specified for the GNSS receiver is received from an application running on the mobile device.

12. The method of claim 11, wherein the application running on the mobile device is configured to receive an input from a user of the mobile device and to set the power consumption limit based on the input from the user of the mobile device.

13. The method of claim 1, wherein the power consumption limit specified for the GNSS receiver is determined based on an accuracy requirement of at least one application running on the mobile device.

14. The method of claim 1, wherein the power consumption limit specified for the GNSS receiver is determined based at least in part on whether the mobile device is receiving power from an external power source or from a battery associated with the mobile device.

15. The method of claim 1, wherein the power consumption limit specified for the GNSS receiver can be specified as a hard limit or a soft limit, the method further comprising operating the GNSS receiver in a low power state in which the GNSS search is not conducted responsive to determining that the GNSS search would exceed the hard limit.

16. The method of claim 1, wherein the power consumption limit is associated with a power budget for the GNSS receiver, and selecting the GNSS search mode comprises selecting a GNSS search mode associated with an estimated power consumption that exceeds the power consumption limit specified for the GNSS receiver but does not exceed the power budget for the GNSS receiver.

17. An apparatus for managing power consumption of a Global Navigation Satellite System (GNSS) receiver of a mobile device, the apparatus comprising:
means for deriving a GNSS search window for the GNSS receiver based on a position uncertainty (PUNC) and a time uncertainty (TUNC), the PUNC being determined at least in part by sensor data indicating whether the mobile device is stationary or has moved less than a predetermined threshold distance from a last known position;
means for selecting a GNSS search mode based on the GNSS search window and resources available for searching for signals from GNSS satellite vehicles (SVs), wherein an estimated power consumption associated with execution of a GNSS search associated with the GNSS search mode does not exceed a power consumption limit specified for the GNSS receiver;
means for conducting the GNSS search using the GNSS search mode; and
means for estimating a position of the mobile device using results of the GNSS search.

18. The apparatus of claim 17, wherein the means for selecting the GNSS search mode comprises means for selecting the GNSS search mode from a low uncertainty mode and a high uncertainty mode, the low uncertainty mode being associated a smaller search window and a higher duty cycle, the high uncertainty mode being associated with a larger search window and a lower duty cycle.

19. The apparatus of claim 18, wherein the means for selecting the GNSS search mode from the low uncertainty mode and the high uncertainty mode based on the GNSS search window and the resources available for searching for signals from GNSS SVs comprises:
means for selecting the low uncertainty mode as the GNSS search mode responsive to the estimated power consumption required to support the GNSS search window being less than or equal to the resources available for concurrently searching for signals from GNSS SVs; and
means for selecting the high uncertainty mode as the GNSS search mode responsive to the estimated power consumption required to support the GNSS search window being greater than the resources available for concurrently searching for signals from GNSS SVs.

20. The apparatus of claim 17, further comprising:
means for estimating the position of the mobile device without using the results of the GNSS search responsive to the estimated power consumption required to support the GNSS search window at the GNSS receiver exceeding the resources available for concurrently searching for signals from GNSS SVs by a predetermined threshold.

21. The apparatus of claim 17, wherein the power consumption limit specified for the GNSS receiver is determined based on one or more of an input received from an application running on the mobile device, an accuracy requirement of the application running on the mobile device, a user input, and information indicating whether the mobile device is receiving power from an external power source.

22. A mobile device for compensating for managing power consumption of a Global Navigation Satellite System (GNSS) receiver of the mobile device, the mobile device comprising:
a tangible, non-transitory computer-readable memory;
a plurality of modules comprising processor executable code stored in the tangible, non-transitory computer-readable memory;
a processor connected to the memory and configured to access the plurality of modules stored in the memory; and
a low power positioning method module configured to derive a GNSS search window for the GNSS receiver based on a position uncertainty (PUNC) and a time uncertainty (TUNC), the PUNC being determined at least in part by sensor data indicating whether the mobile device is stationary or has moved less than a predetermined threshold distance from a last known position,
select a GNSS search mode based on the GNSS search window and resources available for searching for signals from GNSS satellite vehicles (SVs), wherein an estimated power consumption associated with execution of a GNSS search associated with the GNSS search mode does not exceed a power consumption limit specified for the GNSS receiver, and conduct the GNSS search using the GNSS search mode; and a position determination module configured to estimate a position of the mobile device based at least in part on results of the GNSS search.

23. The mobile device of claim 22, wherein the low power positioning method module is configured to select the GNSS search mode from a low uncertainty mode and a high uncertainty mode, the low uncertainty mode being associated a smaller search window and a higher duty cycle, the high uncertainty mode being associated with a larger search window and a lower duty cycle.

24. The mobile device of claim 23, wherein the low power positioning method module is configured to:
select the low uncertainty mode as the GNSS search mode responsive to the estimated power consumption required to support the GNSS search window being less than or equal to the resources available for concurrently searching for signals from GNSS SVs; and
select the high uncertainty mode as the GNSS search mode responsive to the estimated power consumption required to support the GNSS search window being greater than the resources available for concurrently searching for signals from GNSS SVs.

25. The mobile device of claim 22, wherein the position determination module is configured to:
estimate the position of the mobile device without using results of the GNSS search responsive to the estimated power consumption required to support the GNSS search window at the GNSS receiver exceeding the resources available for concurrently searching for signals from GNSS SVs by a predetermined threshold.

26. The mobile device of claim 22, wherein the low power positioning method module is configured to determine the power consumption limit specified for the GNSS based on one or more of an input received from an application running on the mobile device, an accuracy requirement of the application running on the mobile device, a user input, and information indicating whether the mobile device is receiving power from an external power source.

27. A non-transitory, computer-readable medium, having stored thereon computer-readable instructions for managing power consumption of a Global Navigation Satellite System (GNSS) receiver of a mobile device, comprising instructions configured to cause a computer to:
derive a GNSS search window for the GNSS receiver based on a position uncertainty (PUNC) and a time uncertainty (TUNC), the PUNC being determined at least in part by sensor data indicating whether the mobile device is stationary or has moved less than a predetermined threshold distance from a last known position;
select a GNSS search mode based on the GNSS search window and resources available for searching for signals from GNSS satellite vehicles (SVs), wherein an estimated power consumption associated with execution of a GNSS search associated with the GNSS search mode does not exceed a power consumption limit specified for the GNSS receiver;
conduct the GNSS search using the GNSS search mode; and
estimate a position of the mobile device based at least in part on results of the GNSS search.

28. The non-transitory, computer-readable medium of claim 27, wherein the instructions configured to cause the computer to select the GNSS search mode comprise instructions configured to cause the computer to select the GNSS search mode from a low uncertainty mode and a high uncertainty mode, the low uncertainty mode being associated a smaller search window and a higher duty cycle, the high uncertainty mode being associated with a larger search window and a lower duty cycle.

29. The non-transitory, computer-readable medium of claim 28, wherein the instructions configured to cause the computer to select the GNSS search mode from the low uncertainty mode and the high uncertainty mode based on the GNSS search window and the resources available for searching for signals from GNSS SVs comprise instructions configured to cause the computer to:
select the low uncertainty mode as the GNSS search mode responsive to the estimated power consumption required to support the GNSS search window being less than or equal to the resources available for concurrently searching for signals from GNSS SVs; and
select the high uncertainty mode as the GNSS search mode responsive to the estimated power consumption required to support the GNSS search window being greater than the resources available for concurrently searching for signals from GNSS SVs.

30. The non-transitory, computer-readable medium of claim 27, further comprising instructions configured to cause the computer to:
estimate the position of the mobile device without using results of the GNSS search responsive to the estimated power consumption required to support the GNSS search window at the GNSS receiver exceeding the resources available for concurrently searching for signals from GNSS SVs by a predetermined threshold.

* * * * *